(12) United States Patent
Braverman et al.

(10) Patent No.: US 10,567,213 B1
(45) Date of Patent: Feb. 18, 2020

(54) SYSTEMS AND METHODS FOR SELECTING SPECIFIC CODE SEGMENTS IN CONJUNCTION WITH EXECUTING REQUESTED TASKS

(71) Applicant: Binaris Inc, Los Gatos, CA (US)

(72) Inventors: Avner Braverman, Tel-Aviv (IL); Michael Adda, Dimona (IL); Ariel Shaqed, Tel Aviv (IL)

(73) Assignee: Binaris Inc, Sunnyvale, CA (US)

( * ) Notice: Subject to any disclaimer, the term of this patent is extended or adjusted under 35 U.S.C. 154(b) by 134 days.

(21) Appl. No.: 15/793,805

(22) Filed: Oct. 25, 2017

Related U.S. Application Data

(60) Provisional application No. 62/529,176, filed on Jul. 6, 2017, provisional application No. 62/530,369, filed on Jul. 10, 2017.

(51) Int. Cl.
*H04L 29/08* (2006.01)
*G06F 15/16* (2006.01)
(Continued)

(52) U.S. Cl.
CPC ........ *H04L 29/08153* (2013.01); *G06F 9/505* (2013.01); *G06F 16/27* (2019.01); *H04L 29/08243* (2013.01)

(58) Field of Classification Search
CPC ......... H04L 29/08153; H04L 29/08243; H04L 29/08468; G06F 9/50; G06F 9/5027;
(Continued)

(56) References Cited

U.S. PATENT DOCUMENTS

| 5,784,594 | A | 7/1998 | Beatty |
| 7,353,223 | B2 * | 4/2008 | Klein ...................... G06F 16/27 707/610 |

(Continued)

OTHER PUBLICATIONS

Newhouse, T., & Pasquale, J. "Java active extensions: scalable middleware for performance-isolated remote execution". Computer communications Journal, 28(14), 1680-1691, 2005 (Year: 2005).
(Continued)

*Primary Examiner* — Ruolei Zong
(74) *Attorney, Agent, or Firm* — Active Knowledge Ltd.

(57) ABSTRACT

System and methods for receiving requests for executing specific tasks, analyzing current computational resources available for executing the tasks, and selecting code segments for executing the tasks, in which the selection of the code segments is done in a way that optimizes allocation of the various computational resources among the tasks, and such that said optimization is directed and facilitated by taking into consideration constraints and guidelines associated with the requests. Each of the tasks is associated with at least two code segments operative to execute the task, in which per a given task, different code segments operative to execute the task are associated with different computational resources needed for such execution. The selection of specific code segments in turn affects utilization of the computational resources. Guidelines such as latency requirements, cost constraints, and specific sources of code may be considered when selecting code segments in conjunction with resource availability.

25 Claims, 11 Drawing Sheets

(51) Int. Cl.
*G06F 9/50* (2006.01)
*G06F 16/27* (2019.01)

(58) Field of Classification Search
CPC ........ G06F 9/5016; G06F 9/505; G06F 16/27; G06F 8/76
USPC ........................................................ 709/226
See application file for complete search history.

(56) References Cited

U.S. PATENT DOCUMENTS

| | | | |
|---|---|---|---|
| 8,090,797 B2 | 1/2012 | Chinta et al. | |
| 8,612,580 B2 | 12/2013 | Gandhi et al. | |
| 8,826,276 B1* | 9/2014 | Li | G06F 9/4843 |
| | | | 709/226 |
| 9,177,237 B2 | 11/2015 | Austin et al. | |
| 9,720,732 B1 | 8/2017 | Shih et al. | |
| 10,013,550 B1 | 7/2018 | Ahuja et al. | |
| 10,025,924 B1 | 7/2018 | Vagin et al. | |
| 10,055,200 B1 | 8/2018 | Russell et al. | |
| 2004/0103194 A1 | 5/2004 | Islam et al. | |
| 2004/0158568 A1* | 8/2004 | Colle | G06Q 10/06 |
| 2004/0205760 A1* | 10/2004 | Foote | G06F 9/50 |
| | | | 718/104 |
| 2006/0190482 A1 | 8/2006 | Kishan et al. | |
| 2007/0083501 A1 | 4/2007 | Pedersen et al. | |
| 2007/0192329 A1 | 8/2007 | Croft et al. | |
| 2008/0072230 A1 | 3/2008 | Jackson | |
| 2008/0134193 A1* | 6/2008 | Corley | G06F 9/52 |
| | | | 718/104 |
| 2009/0013157 A1* | 1/2009 | Beaule | G06F 9/5016 |
| | | | 712/225 |
| 2009/0199201 A1 | 8/2009 | Arimilli et al. | |
| 2009/0328047 A1 | 12/2009 | Li et al. | |
| 2010/0318665 A1 | 12/2010 | Demmer et al. | |
| 2011/0047613 A1 | 2/2011 | Walsh | |
| 2012/0110584 A1 | 5/2012 | Chaudhry et al. | |
| 2012/0131591 A1 | 5/2012 | Moorthi et al. | |
| 2013/0067476 A1 | 3/2013 | Rosenberg et al. | |
| 2013/0346480 A1 | 12/2013 | Certain et al. | |
| 2014/0007128 A1 | 1/2014 | Schroth et al. | |
| 2014/0074641 A1 | 3/2014 | Wang | |
| 2014/0189683 A1 | 7/2014 | Bing et al. | |
| 2014/0304399 A1 | 10/2014 | Chaudhary et al. | |
| 2015/0006735 A1* | 1/2015 | Chai | G06F 15/00 |
| | | | 709/226 |
| 2015/0149273 A1 | 5/2015 | Schweier | |
| 2015/0254455 A1 | 9/2015 | Sandhu et al. | |
| 2015/0312115 A1 | 10/2015 | Clubb et al. | |
| 2015/0350311 A1 | 12/2015 | Arai et al. | |
| 2016/0110224 A1 | 4/2016 | Cao et al. | |
| 2016/0337426 A1 | 11/2016 | Shribman et al. | |
| 2017/0006059 A1 | 1/2017 | Meulenhoff et al. | |
| 2017/0192802 A1 | 7/2017 | Sampathkumar et al. | |
| 2017/0323343 A1* | 11/2017 | Dey | G06Q 30/0267 |
| 2018/0136959 A1 | 5/2018 | Vyas et al. | |
| 2018/0150325 A1 | 5/2018 | Kuo et al. | |
| 2018/0321976 A1 | 11/2018 | Chen et al. | |
| 2018/0336113 A1 | 11/2018 | Asawa et al. | |
| 2018/0349168 A1 | 12/2018 | Ahmed | |

OTHER PUBLICATIONS

Ravid Brown; "Running Containers on Bare Metal vs. VMs: Performance and Benefits"; strattoscale.com blog page; Jan. 11, 2017 (Year: 2017).

Shetty et al.; "An Empirical Performance Evaluation of Docker Container, Openstack Virtual Machine and Bare Metal Server"; Indonesian Journal of Electrical Engineering and Computer Science, vol. 7, No. 1; Jul. 1, 2017 (Year: 2017).

"Amazon Serverless computing or Google Function as a Service (FaaS) vs Microservices and Container Technologies"; AgileStacks. com blog page; Sep. 12, 2016 (Year: 2016).

* cited by examiner

SYSTEMS AND METHODS FOR SELECTING SPECIFIC CODE SEGMENTS IN CONJUNCTION WITH EXECUTING REQUESTED TASKS

CROSS REFERENCE TO RELATED APPLICATIONS

This Application claims priority to U.S. Provisional Patent Application No. 62/529,176, filed on Jul. 6, 2017, which is hereby incorporated by reference.

This Application claims priority to U.S. Provisional Patent Application No. 62/530,369, filed on Jul. 10, 2017, which is hereby incorporated by reference.

BACKGROUND

In a client-server architecture, such as a miroservice architecture employing clients and servers, a client may send a request to a server to perform a certain service or a task, such as a microservice, that is needed by the client. The request is sent to the server using a certain protocol, such as a remote-procedure-call (RPC) protocol, in which the requestor directs the request to a certain target device, which executes the task requested upon receiving the request. In such client-server architectures, the task requested is often associated with data components, such as code segments and data sets, which are needed for execution of the task requested. Various parameters, such as load conditions, latency performance, and communication bandwidth availability may greatly affect performance in such client-server architectures. When a client decides to send a request to a certain target device or server, the result may be sub-optimal in respect to: (i) the time it takes the server to execute the requested task and respond, (ii) the efficiency of allocating computational resources in the server in conjunction with executing the requested task, and (iii) the ability of the server to handle a large number of requests simultaneously in an effective way.

SUMMARY

One embodiment is a method (FIG. 6A) for selecting a particular code segment for executing a specific task while complying with a certain execution constraint. The method includes: receiving a request to execute a specific task, in which said execution is required to comply with at least one certain constraint; accessing a database comprising a plurality of code segments, in which at least two of the code segments in the database are operative to facilitate execution of the specific task requested, and in which each of the code segments requires a respective sub-set of physical computational resources to be successfully executed; determining, per each of the at least two code segments, and given a current state of physical computational resources availability, a system constraint arising in conjunction with allocating the respective sub-set of physical computational resources; and selecting, out of the at least two code segments, one particular code segment that allows compliance with the certain constraint in view of the respective system constraint.

One embodiment is a system (FIG. 5) operative to select a particular code segment for executing a specific task while complying with a certain execution constraint. The system includes: a pool of physical computational resources; and a database comprising a plurality of code segments, in which at least two of the code segments in the database are operative to facilitate execution of a specific task, and in which each of the code segments requires a respective sub-set of physical computational resources, out of the pool of physical computational resources, to be successfully executed. In one embodiment, the system is configured to: receive a request to execute the specific task, in which said execution is required to comply with at least one certain constraint; access the at least two code segments in the database; determine, per each of the at least two code segments, and given a current state of physical computational resources availability in the pool, a system constraint arising in conjunction with allocating the respective sub-set of physical computational resources; and select, out of the at least two code segments, one particular code segment that allows compliance with the certain constraint in view of the system constraint associated with said one particular code segment selected.

One embodiment is a method (FIG. 6B) for selecting a particular code segment for executing a specific task while complying with a certain constraint. The method includes: receiving a request to execute a specific task, in which said execution is required to comply with at least one certain constraint; accessing a database comprising a plurality of code segments, in which at least two of the code segments in the database are operative to facilitate execution of the specific task requested, and in which each of the code segments requires a respective sub-set of physical computational resources to be successfully executed; determining, per each of the at least two code segments, and given a current state of physical computational resources availability, a feasibility of successfully allocating the respective sub-set of physical computational resources; and selecting, out of the at least two code segments, one particular code segment for which: (i) successful allocation of the respective sub-set of physical computational resources was determined to be feasible, and (ii) using the particular code segment, given successful allocation of the respective sub-set of physical computational resources, is operative to comply with the certain constraint.

One embodiment is a system (FIG. 5) operative to select particular code segments for executing specific tasks. The system includes: a pool of physical computational resources; and a plurality of code segments, in which: (i) each of the code segments is operative to facilitate execution of a specific task, and (ii) for any given specific task there are at least two possible code segments able to facilitate execution thereof, in which each of the possible code segments requires a different sub-set of physical computational resources, out of the pool of physical computational resources, to be successfully executed. In one embodiment, the system is configured to receive a plurality of requests associated respectively with a plurality of constraints, in which each of the requests is a request to execute a specific one of the tasks while complying with the respective constraint; and the system is further configured to dynamically assess current availability of physical computational resources, out of the pool of physical computational resources, and select, per each of the requests and the respective task, a specific one of the at least two code segments able to facilitate execution thereof, in which said plurality of selections, as a whole, are made to results in a respective plurality of sub-sets of physical computational resources that are together optimized to fit within said physical computational resources currently available, while each of the selections is also made to specifically result in the respective sub-set of physical computational resources that is operative to facilitate compliance with the respective constraint.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1:
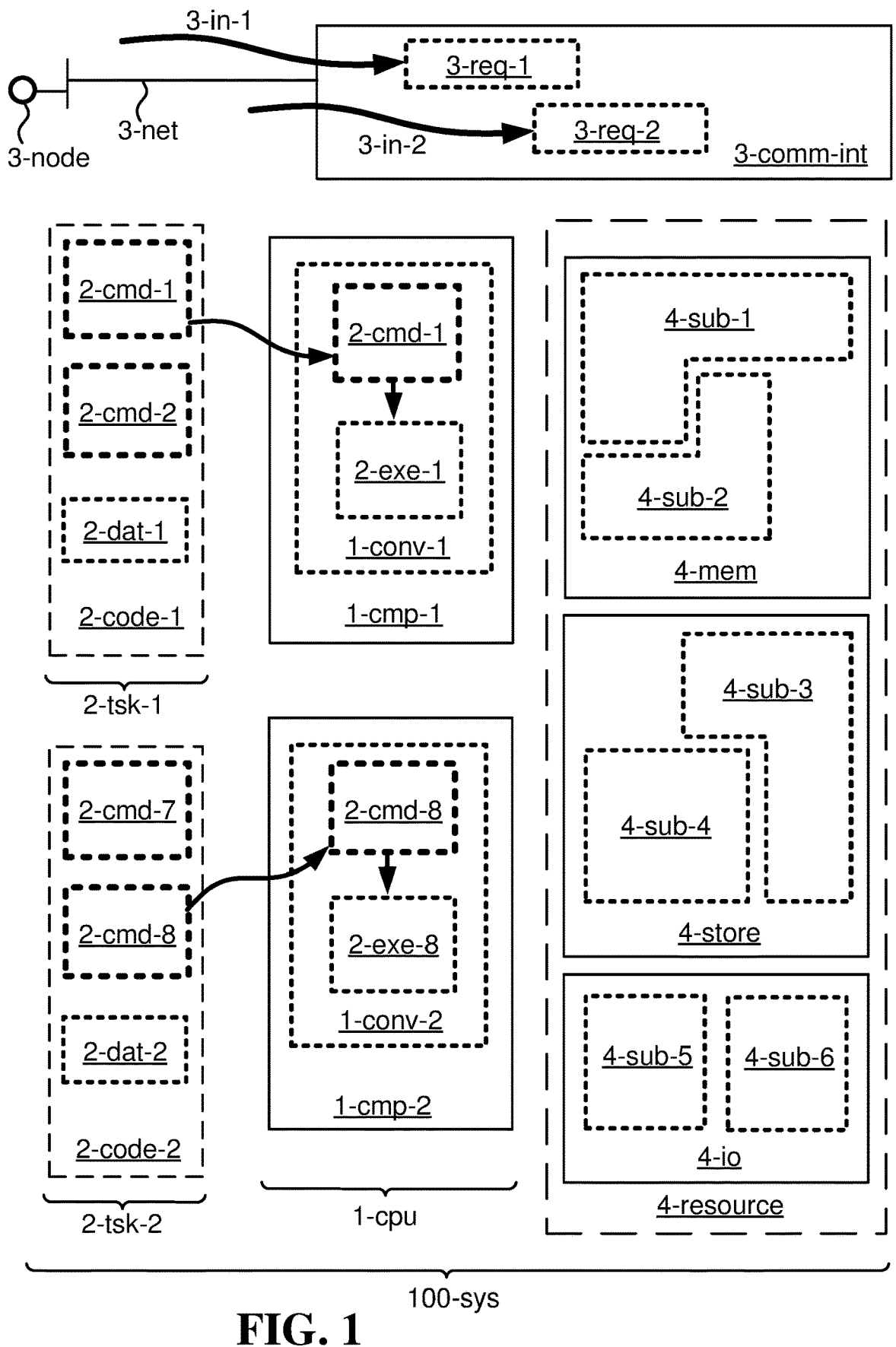
FIG. 1 illustrates one embodiment of a system operative to facilitate on-demand isolated execution of a plurality of tasks.

FIG. 1 illustrates one embodiment of a system 100-sys operative to facilitate on-demand isolated execution of a plurality of tasks. System 100-sys may be a server or a cluster of servers, a mainframe computer system, a supercomputer, a personal computer, or even a graphical processing system. System 100-sys includes a set of physical computational resources 4-resource, at least one compute element 1-cmp-1, 1-cmp-2 belonging to at least one data processing unit 1-cpu, and a communication interface 3-comm-int. System 100-sys receives 3-in-1, 3-in-2, via the communication interface 3-comm-int, a plurality of requests 3-req-1, 3-req-2 to execute respectively a plurality of tasks 2-tsk-1, 2-tsk-2. The requests 3-req-1, 3-req-2 could be in the form of a remote procedure call (RPC), which is a protocol allowing one entity to request, possibly via a network, a service from (or the execution of a task by) another entity often located in another system, or the requests could be in another form such as a signal, an interrupt, or a message of some sort. The communication interface 3-comm-int conveying the requests to the system may be a network interface, a communication port, a bus of some sort, or any mechanism through which the system is made aware of the requests. The requests may be generated by a node 3-node of some sort, either external or internal to the system 100-sys. The node 3-node may be a device requesting a service, such a mobile phone, a component in another system requesting system 100-sys to perform a certain task, or even an internal component or process inside system 100-sys requesting a service. Each of the tasks 2-tsk-1, 2-tsk-2 could be a certain service needed by the requestor, a function or a subroutine call made by the requestor, or any other required process which results in a specific outcome, a specific data, or a certain conclusion needed by the requestor at the time of making the request. In many cases, the requestor 3-node is making the request in anticipation of receiving some kind of an answer or result from system 100-sys within a certain period of time, and in that case the requesting process is synchronous in the sense that the request triggers a task within the system, which is turns triggers a response process. The entire request-process-respond procedure may be required to be of a real-time nature, and in that case there would be a certain latency tolerated by the requestor, in which this latency could be expected to be as low as 1 (one) second, 100 (one hundred) milliseconds, or even 10 (ten) milliseconds or lower. In other cases the request is not associated with a synchronous respond procedure, and may be logged in the system until a certain activation event occurs.

Upon receiving each of the requests 3-req-1, 3-req-2, the system reacts to the specific request (e.g., to request 3-req-1 associated with task 2-tsk-1) by allocating on-demand a unique sub-set of the physical computational resources 4-resource for usage by the associated task. For example, the sub-set 4-sub-1, 4-sub-3, 4-sub-5 is now allocated specifically for performing task 2-tsk-1 as a response to request 3-req-1. The allocation of the sub-set 4-sub-1, 4-sub-3, 4-sub-5 is made by a demand of the specific request 3-req-1 (on-demand), in which said demand may be implicit by the mere existence of the specific request, or it may be explicit via a field or a data element within the specific request. The physical computational resources 4-resource may include memory resources 4-mem, storage resources 4-store, or other resources such as input-output (I/O) resources 4-io. The sub-set 4-sub-1, 4-sub-3, 4-sub-5 allocated for 2-tsk-1 is unique, and does not overlap with other sub-sets 4-sub-2, 4-sub-4, 4-sub-6 that may be allocated to other tasks 2-tsk-2 as a response to other requests 3-req-2.

When a sub-set is allocated, e.g., sub-set 4-sub-1, 4-sub-3, 4-sub-5, the system will then proceed with execution of the respective task 2-tsk-1. However, execution of the respective task is not done in an ordinary fashion, but rather using a particular execution process designed to make sure task 2-tsk-1 is executed utilizing resources within sub-set 4-sub-1, 4-sub-3, 4-sub-5 juts allocated, and without utilizing, accessing, or using resources within the physical computational resources 4-resource that were not allocated to 2-tsk-1, such as 4-sub-2, 4-sub-4, 4-sub-6. The motivation for using such a particular execution process may be to make sure 2-tsk-1 does not interfere, alter, or otherwise affect, in any way, the execution of other tasks 2-tsk-2 and resources associated therewith, and to make sure that such interferences are not projected, intentionally or unintentionally, by the other tasks 2-tsk-2 on the resources allocated to 2-tsk-1 or on 2-tsk-1 itself. The result is an isolated execution of each of the tasks.

The particular execution process which results in isolated execution of the tasks 2-tsk-1, 2-tsk-2 may be achieved by performing a careful conversion of code associated with each of the tasks. 2-tsk-1 is associated with a certain code segment 2-code-1 comprising commands 2-cmd-1, 2-cmd-2 and other associated elements such as data elements 2-dat-1, and 2-tsk-2 is associated with a certain other code segment 2-code-2 comprising commands 2-cmd-7, 2-cmd-8 and other associated elements 2-dat-2. When a code, such as 2-code-1, is converted 1-conv-1 to executable instructions 2-exe-1, it is converted so as to cause the resulting executable instructions 2-exe-1 to contain access parameters that are solely within the span of sub-set 4-sub-1, 4-sub-3, 4-sub-5 allocated to the associated task 2-tsk-1. For example, when memory write command 2-cmd-1 is converted 1-conv-1, the resulting executable instruction/s 2-exe-1 will contain an executable memory write instruction having an address field that is guaranteed by the conversion process to fall within the address span of 4-sub-1, in which 4-sub-1 is the part of memory 4-mem that was specifically allocated to 2-tsk-1. Similarly, when storage access command 2-cmd-2 is converted 1-conv-1, the resulting executable instruction/s will contain an executable storage access instruction/s having access field/s that are guaranteed by the conversion process to be associated only with 4-sub-3, in which 4-sub-3 is the part of storage 4-store that was specifically allocated to 2-tsk-1. In a similar fashion, when 2-code-2 is converted 1-conv-2 to executable instruction/s 2-exe-8, the resulting access/address fields are guaranteed by 1-conv-2 to be contained within the span of the resources sub-set 4-sub-2, 4-sub-4, 4-sub-6 allocated to 2-tsk-2. Now, when the system executes 2-exe-1 for task 2-tsk-1, and 2-exe-8 for task 2-tsk-2, it is guaranteed that 2-exe-1 operates only within the resource limits of 4-sub-1, 4-sub-3, 4-sub-5, and that 2-exe-8 operates only within the resource limits of sub-set 4-sub-2, 4-sub-4, 4-sub-6, which results in task 2-tsk-1 being isolated from task 2-tsk-2 and vice versa.

The conversions 1-conv-1, 1-conv-2 may be done using a compilation process—i.e., all of the commands 2-cmd-1, 2-cmd-2 converted together as a whole, and all of the commands 2-cmd-7, 2-cmd-8 converted together as a whole, or the conversions may be done using an interpretation process—i.e., the commands 2-cmd-1, 2-cmd-2 are converted one-by-one or just-in-time for execution.

The entire process of receiving one of the requests, allocating a sub-set of resources to the respective task, converting-and-executing the task, and responding to the requestor, could be made synchronous and on-the-fly, so as to create an event flow that can facilitate real-time and on-demand isolation for each of the tasks, and that is perceived by the requestor as an immediate response. When finishing execution of each of the tasks, the system may de-allocated/release the respective sub-set of resources for other tasks or purposes. The result may be that at the time the requestor gets its response, the sub-set of resources that has served the requestor is already allocated by the system to another task; this flow of events demonstrates the real-time potential of the system, which could facilitate massive scaling and the serving of a very large number of requests/isolated execution of tasks concurrently. The allocation and de-allocation of resources for a task per a request may be an integral part of such flow of events and may therefore contribute significantly to the efficiency and scalability of the real-time isolation mechanism just described.

Each of the tasks 2-tsk-1, 2-tsk-2 could be a stored procedure—i.e., already present within the system 100-sys at the time of receiving the respective request, or it could be delivered to the system in conjunction with the respective requests itself. In addition, a single task code could be reused in many instances by many respective requests, but in which each instance is still allocated with a unique sub-set of the resources per the respective request.

A certain non-limiting scenario is now presented by way of example only. A Smartphone 3-node may need to use an online machine-learning prediction model to analyze locally gathered data, in which the system 100-sys has the online machine-learning prediction model embedded in one of the tasks. The Smartphone sends a request to the system via a communication network 3-net, in which the request includes said locally gathered data and a reference to the relevant task. The system receives the request, and immediately allocates unique memory and storage space for serving the request. The system then converts the relevant task to executable instructions configured to work in conjunction with said unique memory and storage spaces just allocated, and executes the executable instructions to produce a prediction for the Smartphone. The prediction is then sent to the Smartphone via the communication network, while the unique memory and storage spaces are quickly released, and optionally already allocated to a completely different task.

One embodiment is a system 100-sys operative to facilitate on-demand isolated execution of a plurality of tasks. The system includes: (i) a set of physical computational resources 4-resource, (ii) at least one compute element 1-cmp-1, 1-cmp-2 belonging to at least one central-processing-unit 1-cpu, and (iii) a communication interface 3-comm-int.

In one embodiment, the system 100-sys is configured to receive 3-in-1, 3-in-2, via the communication interface 3-comm-int, a plurality of requests 3-req-1, 3-req-2 to execute respectively a plurality of tasks 2-tsk-1, 2-tsk-2, in which each of the plurality of tasks comprises a plurality of commands (e.g., 2-tsk-1 comprises the commands 2-cmd-1, 2-cmd-2, and 2-tsk-2 comprises the commands 2-cmd-7, 2-cmd-8).

In one embodiment, the system 100-sys is further configured to react, to each the requests 3-req-1, 3-req-2 received, by allocating on-demand and per the request received, a unique sub-set of the physical computational resources 4-resource, so that a plurality of the unique sub-sets coexists at least temporarily in conjunction with the plurality of tasks respectively (e.g., sub-set 4-sub-1, 4-sub-3, 4-sub-5 is allocated on-demand to task 2-tsk-1 as a direct and immediate reaction to receiving 3-req-1, and sub-set 4-sub-2, 4-sub-4, 4-sub-6 is allocated on-demand to task 2-tsk-2 as a direct and immediate reaction to receiving 3-req-2).

In one embodiment, the system 100-sys is further configured to execute, per each of the plurality of tasks 2-tsk-1, 2-tsk-2, in a designated one of the compute elements 1-cmp-1, 1-cmp-2, the respective commands of the task (e.g., commands 2-cmd-1, 2-cmd-2 of task 2-tsk-1 are executed in 1-cmp-1, and commands 2-cmd-7, 2-cmd-7 of task 2-tsk-2 are executed in 1-cmp-2), by converting 1-conv-1, 1-conv-2 the respective commands of the task into executable instructions and running the executable instructions (e.g., 2-cmd-1 is specifically shown to be converted into 2-exe-1, but command 2-cmd-2 is also converted either separately or jointly, and 2-cmd-8 is specifically shown to be converted into 2-exe-8, but command 2-cmd-7 is also converted either separately or jointly), in which the respective commands of the task are converted so as to cause the respective executable instruction to not access other unique sub-sets that were not allocated to the task, thereby facilitating said on-demand isolated execution of each of the plurality of tasks (e.g., 2-exe-1 of task 2-tsk-1 is generated so as to not access sub-set 4-sub-2, 4-sub-4, 4-sub-6 that was allocated to task 2-tsk-2, and 2-exe-8 of task 2-tsk-2 is generated so as to not access sub-set 4-sub-1, 4-sub-3, 4-sub-5 that was allocated to task 2-tsk-1).

In one embodiment, the system 100-sys is further configured to terminate the on-demand isolated execution of each of the tasks 2-tsk-1, 2-tsk-2 immediately upon a particular event associated with the task, thereby releasing immediately the respective unique sub-set of the task (e.g., releasing 4-sub-1, 4-sub-3, 4-sub-5 upon termination of 2-tsk-1, and releasing 4-sub-2, 4-sub-4, 4-sub-6 upon termination of 2-tsk-2), thereby assuring that the respective unique sub-set of each of the tasks exist only for a duration in which the task is being executed and being terminated. In one embodiment, said duration of existence, on average, is between 1 (one) milliseconds and one (1) second, an average time for performing said allocation for each the unique sub-sets is less than 1/10 (one tenth) of said duration, and an average time for performing said releasing for each the unique sub-sets is less than 1/10 (one tenth) of said duration. In one embodiment, said plurality of requests 3-req-1, 3-req-2 are received as a stream of incoming requests, and said duration and average times allow, per each of the compute elements 1-cmp-1, 1-cmp-2, to sustain, on average, a rate of executing of at least one of the tasks 2-tsk-1, 2-tsk-2 per second, and up to a maximum rate of executing 1000 (one thousand) of the tasks per second. In one embodiment, each of the requests 3-req-1, 3-req-2 is a remote-procedure-call (RPC).

In one embodiment, the system 100-sys is a computing platform that communicates with remote nodes 3-node via said communication interface 3-comm-int and a network 3-net, the communication interface is a physical network adapter connected to the network, and the requests 3-req-1, 3-req-2 are received in the system 100-sys, from the remote nodes 3-node, via the network 3-net.

In one embodiment, the communication interface is a logical interface, and at least some f the requests are generated from within the system and possibly by some of the tasks themselves.

in one embodiment, at least one of the requests 3-req-1, 3-req-2 is a remote-procedure-call (RPC).

In one embodiment, at least one of the tasks 2-tsk-1, 2-tsk-2 is configured to calculate at least one value, and to return the value as a respond to the respective remote node 3-node upon said termination of the task.

In one embodiment, at least one of the tasks 2-tsk-1, 2-tsk-2 is configured to receive a value via the respective request 3-req-1, 3-req-2, and to use this value in conjunction with the respective execution of the respective commands.

In one embodiment, at least one of the requests 3-req-1, 3-req-2 is an internal system request associated with a system event that requires handling by one of the tasks 2-tsk-1, 2-tsk-2.

In one embodiment, the set of physical computational resources 4-resource comprises at least one of: (i) physical memory 4-mem such as a random-access-memory (RAM) or a flash memory, in which each of the unique sub-sets 4-sub-1, 4-sub-2 is a unique subset of the physical memory, (ii) physical storage 4-store such as magnetic hard disks or flash disks, in which each of the unique sub-sets 4-sub-3, 4-sub-4 comprises a unique subset of the physical storage, and (iii) input-output (10) channels 4-io, in which each of the unique sub-sets 4-sub-5, 4-sub-6 comprises a unique subset of the IO channels.

In one embodiment, the system 100-sys is further configured to limit, per each of the tasks 2-tsk-1, 2-tsk-2 being executed, an extent to which the task is utilizing other system resource, in which said other system resource comprise at least one of: (i) the respective computer element clock cycles, (ii) communication bandwidth, and (iii) power dissipation.

In one embodiment, the set of physical computational resources 4-resource is a physical memory 4-mem such as a random-access-memory (RAM) or a flash memory, in which each of the unique the sub-sets 4-sub-1, 4-sub-2 is a memory space of less than 1 mbyte (one megabyte), thereby allowing for at least 1,000 (one thousand) of the tasks to be concurrently active per 1 Gbyte (one gigabyte) of the physical memory.

Figure 2:
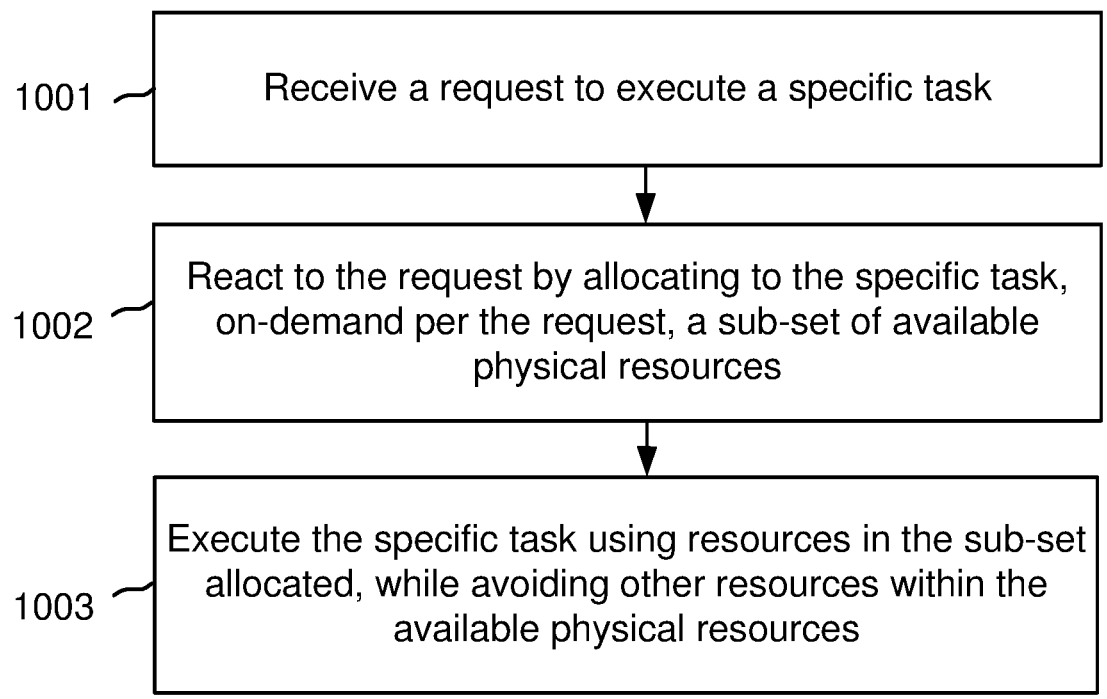
FIG. 2 illustrates one embodiment of method for on-demand isolated execution of specific tasks.

FIG. 2 illustrates one embodiment of a method for on-demand isolated execution of specific tasks. The method comprises: In step 1001, receiving 3-in-1, via a communication interface 3-comm-int, in a computing platform 100-sys, a request 3-req-1 to execute a specific task 2-tsk-1, in which the specific task is expressed as a first code segment 2-code-1 comprising a plurality of commands 2-cmd-1, 2-cmd-2. In step 1002, reacting, by the computing platform 100-sys, to the request 3-req-1 received, by allocating on-demand and per the request received, a sub-set 4-sub-1, 4-sub-3, 4-sub-5 of physical computational resources 4-resource within the computing platform 100-sys, in which said sub-set allocated is operative to facilitate successful execution of the specific task 2-tsk-1. In step 1003, executing, in the computing platform 100-sys, the specific task 2-tsk-1, by (i) converting each of the commands 2-cmd-1, 2-cmd-2 into executable instructions (e.g., 2-cmd-1 is converted into executable instructions 2-exe-1) and (ii) running the executable instructions, in which the commands are converted 1-conv-1 so as to cause the executable instructions to utilize resources within the allocated sub-set 4-sub-1, 4-sub-3, 4-sub-5 of physical computational resources, while avoiding utilization of other resources 4-sub-2, 4-sub-4, 4-sub-6 that were not allocated for the specific task 2-tsk-1, thereby facilitating said on-demand isolated execution of the specific task 2-tsk-1.

In one embodiment, said specific task 2-tsk-1 has a starting point (e.g., 2-cmd-1) and an ending point (e.g., 2-cmd-2), and the method further comprises: initiating said execution in conjunction with said starting point; continuing said execution till the ending point; terminating said execution immediately after reaching the ending point; and releasing the sub-set 4-sub-1, 4-sub-3, 4-sub-5 of physical computational resources immediately after said termination and regardless of any state set by the specific task 2-tsk-1 in conjunction with the sub-set 4-sub-1, 4-sub-3, 4-sub-5 of physical computational resources.

In one embodiment, a transition between said reception 3-in-1 and said execution takes less than 10 (ten) millisecond as a combined result of said conversion 1-conv-1 being an interpretation process and said allocation on-demand.

In one embodiment, said transition together with said execution till the ending point and including said releasing takes less than 100 (one hundred) milliseconds as a combined result of said interpretation process 1-conv-1, said allocation on-demand, and said specific task 1-tsk-1 having said starting point and ending point.

In one embodiment, the physical computational resources 4-resource comprise physical memory 4-mem, in which the sub-set 4-sub-1 of the physical computational resources comprise a sub-set of the physical memory.

In one embodiment, the code segment 2-code-1 further comprises data sets 2-dat-1, and the method further comprising: setting, using the data sets, in conjunction with said execution, memory values in conjunction with the sub-set 4-sub-1 of the physical memory 4-mem.

In one embodiment, the method further comprises: terminating the task 2-tsk-1 when the task ends; and then immediately releasing the sub-set 4-sub-1 of the physical memory 4-mem for usage by other tasks, and regardless of said setting of memory values which are now no longer relevant upon said termination.

In one embodiment, the method further comprises: terminating said on-demand isolated execution immediately upon a particular event associated with the specific task 2-tsk-1, thereby releasing immediately the sub-set 4-sub-1, 4-sub-3, 4-sub-5 of physical computational resources 4-resource for other tasks.

In one embodiment, said particular event is selected from a group consisting of: (i) an ending or completion of the specific task 2-tsk-1, (ii) a timeout which limits the execution time of the specific task 2-tsk-1, (iii) a fault made by the specific task 2-tsk-1, and (iv) a supervision decision, by the computing platform 100-sys, to terminate the specific task 2-tsk-1.

In one embodiment, the conversion 1-conv-1 is an interpretation process, in which each of the commands is converted and executed separately from the other commands (e.g., 2-cmd-1 is converted and executed separately from 2-cmd-2).

In one embodiment, the conversion 1-conv-1 is a compilation process.

In one embodiment, the conversion 1-conv-1 is a binary translation process.

In one embodiment, said causing of the executable instructions 2-exe-1 to utilize resources within the allocated sub-set 4-sub-1, 4-sub-3, 4-sub-5 is facilitated by generating, in conjunction with said conversion 1-conv-1 and prior to run time, specific access addresses to be utilized by the executable instructions, in which said specific access addresses are guaranteed, by the computing platform, to be contained within a set of addresses associated with the allocated sub-set.

In one embodiment, said causing of the executable instructions 2-exe-1 to utilize resources within the allocated sub-set 4-sub-1, 4-sub-3, 4-sub-5 is facilitated by generating, in conjunction with said conversion 1-conv-1 and prior to run time, specific validation instructions within the executable instructions, in which said specific validation instructions are operative, during run time, to validate specific access addresses utilized by the executable instructions, in which said validation guarantees that the specific access addresses are contained within a set of addresses associated with the allocated sub-set.

In one embodiment, said specific task 2-tsk-1 has a starting point (e.g., 2-cmd-1) and an ending point (e.g., 2-cmd-2), and the method further comprises: initiating said execution in conjunction with said starting point; continuing said execution till the ending point; terminating said execution immediately after reaching the ending point; and preserving the sub-set 4-sub-1, 4-sub-3, 4-sub-5 of physical computational resources after said termination, thereby allowing re-use of the sub-set for consequent tasks that are identified to be associated with a group of tasks to which the specific task belongs.

One embodiment is a unified client-server system for executing services. The services executed by the unified client-server system may be microservices associated with a microservice architecture, or other services in which a first entity sends a request to another entity to execute a certain service needed by the first entity. The system may decide which services to execute on which of a plurality of different kinds of devices located in a variety of places. The decision may affect service request latency, network bandwidth, and power consumption. The unified client-server system may be abstracted via a certain interface, such that the actual execution place of the services is controlled by the system and not necessarily by the requesting entities.

Figure 3:
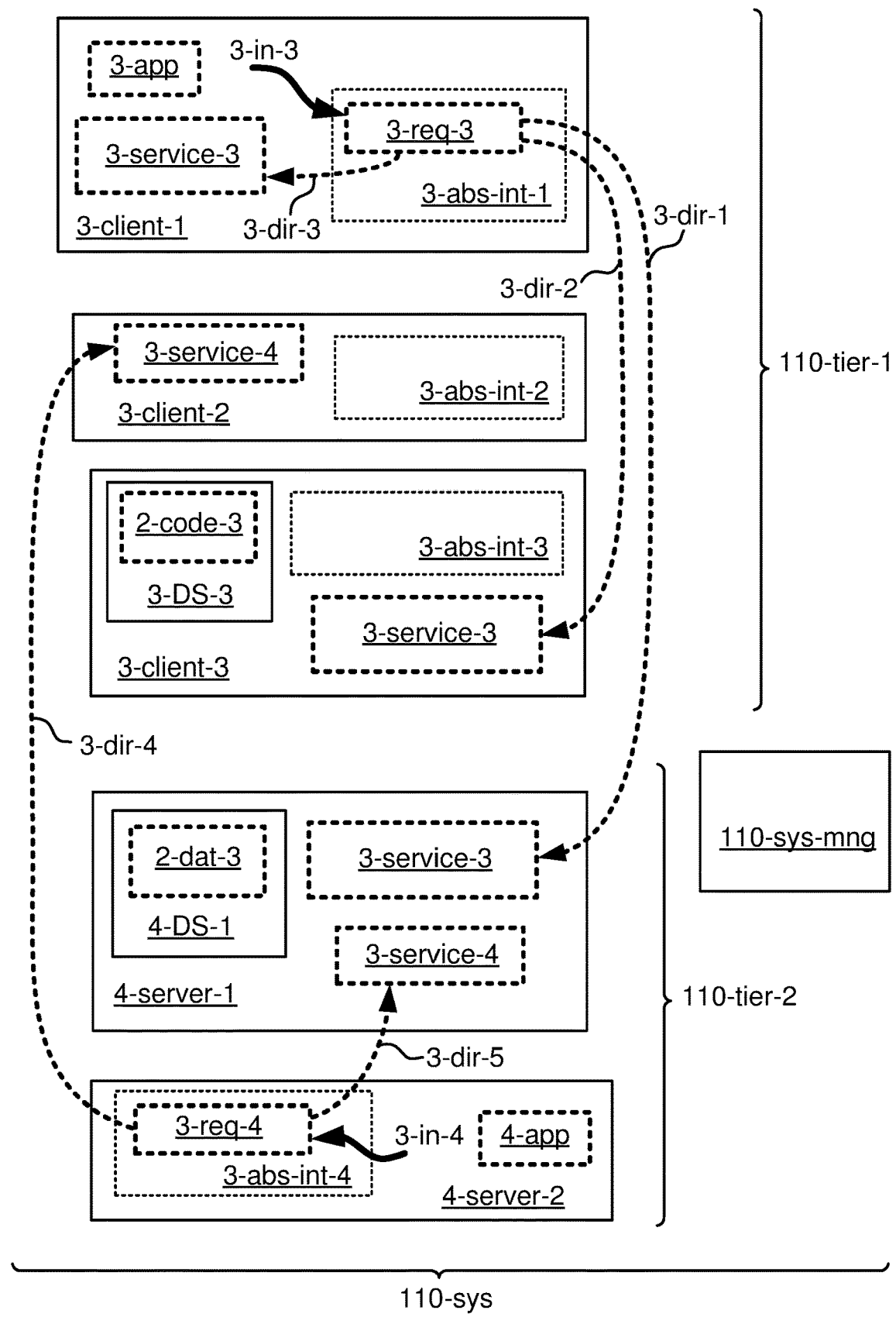
FIG. 3 illustrates one embodiment of a system operative to migrate execution of services across multiple tiers.

FIG. 3 illustrates one embodiment of a system 110-sys operative to migrate execution of services, such as microservices in a microservice architecture, across multiple tiers. A first tier 110-tier-1 of client devices 3-client-1, 3-client-2, 3-client-3 is shown, in which each of the client devices may be a mobile wireless device such as a smartphone or a tablet, or it could be a personal computer or a server computer, an internet-of-things (IoT) device such as a home appliance, or even a component of an autonomous car. A second tier 110-tier-2 of server devices 4-server-1, 4-server-2 is shown, in which at least some of the server devices may be a server located in an office, a cluster of servers in a datacenter, a component of cloud computing, a hardware-specific server such as a digital signal processing (DSP) server, a graphical processing unit (GPU) server, or even a field-programmable gate array (FPGA) server, or any device or a cluster of devices tuned or dedicated for serving a large plurality of users/clients simultaneously. Some of the devices may be both a client device and a server device, in the sense of being able to both originate requests for services and serve requests for services.

A client device, such as a smartphone (e.g., 3-client-1), may run an application 3-app of some sort, in which the application may use a request mechanism, such as a remote procedure call (RPC) protocol, for sending 3-in-3 a request 3-req-3 to execute a task or a service 3-service-3, such as a microservice or a numerical task, on behalf of the client device 3-client-1. The request 3-req-3 to execute the task/service 3-service-3 would normally be sent directly to a known target device for execution, but instead it is directed to an abstraction interface 3-abs-int-1 associated with the client device making the request. The abstraction interface 3-abs-int-1 is shown to be located within the client device making the request, but it could also be located outside the client device. The abstraction interface 3-abs-int-1 or other abstraction interfaces such as 3-abs-int-2, 3-abs-int-3, in conjunction with a management component 110-sys-mng that may be located outside or inside the client device or perhaps even distributed across several locations, makes a decision/selection as to where the service requested 3-service-3 should be executed. The request 3-req-3, or a derivative of the request, is then sent/directed (one of 3-dir-1, 3-dir-2, or 3-dir-3) to the target device selected, the target device receives the request, and executes the service as requested. After execution of the service, the target device may then return a result or response of some sort to the requesting client device.

The service requested 3-service-3 is performed by executing an associated code segment such as 2-code-3. The code segment may be located in a data store such as 3-DS-3, which may be located locally in the requesting device 3-client-1, or it may be located in another of the client devices such as 3-client-3 or in one of the server devices 4-server-1, 4-server-2. In addition, a data set, such as 2-dat-3, may be required as an input for the execution of the service requested 3-service-3. The data set may be located in a data store such as 4-DS-1, which may be located locally in the requesting device 3-client-1, or it may be located in another of the devices such as server device 4-server-1.

Since data components such as 2-code-3, 2-dat-3, may be needed for the execution of service 3-service-3, it would make sense to try and execute 3-service-3 as close as possible to the data components, and preferably maybe even to execute 3-service-3 in one of the devices storing one or more of the data components. The abstraction interface 3-abs-int-1, in conjunction with the management component 110-sys-mng, could try to select the target device according to proximity to one or more of the data components. For example, if execution of 3-service-3 requires both 2-code-3 and 2-dat-3, then 3-abs-int-1, 110-sys-mng may decide to select 3-client-3 as the target device for executing 3-service-3, because 2-code-3 is already located in 3-DS-3 in 3-client-3, perhaps as a stored procedure, and therefore executing 3-service-3 in 3-client-3 would not require a transport of the code segment 2-code-3 to another location of execution, in which such transport could involve additional cost or latency in executing 3-service-3. Alternatively, 3-abs-int-1, 110-sys-mng may decide to select 4-server-1 as the target device for executing 3-service-3, because 2-dat-3 is already located in 4-DS-1 in 4-server-1, perhaps as a large database of some sort, and therefore executing 3-service-3 in 4-server-1 would not require a transport of the data set 2-dat-3 to another location of execution. If 2-dat-3 is larger than 2-code-3, then 4-server-1 could be the better selection, and 3-abs-int-1, 110-sys-mng would act accordingly by directing 3-dir-1 the request 3-req-3 to 4-server-1. Server device 4-server-1 would get the request 3-req-3 or a derivative thereof, and use the locally available data set 2-dat-3 to execute 3-service-3, together with code segment 2-code-3 that needs to be transported from 3-client-3 to 4-server-1. Such transport of code segment 2-code-3 could be directed by the management component 110-sys-mng, or by the server device 4-server-1 itself.

Although the selection of a target device for executing a requested service 3-service-3 may be affected by the location of various data components needed for executing 3-service-3, there are other criteria by which the system 110-sys may select target devices for executing requested services. For example, 3-client-3 may be a peer device such as a personal computer, belongings to a peer device layer associated with 110-tier-1, and therefore 3-abs-int-1, 110-sys-mng may prefer to execute 3-service-3 in 3-client-3 and not in 4-server-1 or 4-server-2 that may belong to a pay-for-usage layer associated with 110-tier-2. In that case, the request 3-req-3 will be directed to 3-client-3, and not to 4-server-1 or 4-server-2, in which execution of 3-service-3 by 3-client-3 is free of charge. In another example, 3-service-3 may be too complex to be executed on a device belonging to 110-tier-1, and therefore 3-abs-int-1, 110-sys-mng may decide to execute 3-service-3 on one of the devices of 110-tier-2, such as 4-server-1. In addition, 4-server-1 may also be equipped with special hardware, such as a DSP cluster, that may be critical for the efficient execution of 3-service-3. In a different exemplary scenario, 3-service-3 may be very simple, so 3-abs-int-1, 110-sys-mng may decide to execute it locally, in the requesting device 3-client-1 itself, in order to minimize latency. In such a case, the request will be directed 3-dir-3 back to the requesting device 3-device-1. However, in yet another example, although 3-service-3 may be very simple, the device 3-device-1 may be a smartphone with a low battery condition, and therefore 3-abs-int-1, 110-sys-mng may decide to direct the request 3-req-3 to another device. Other criteria may exist, such as communication bandwidth conditions, and moreover, a combination of different criteria may be factored algorithmically by the system 110-sys.

The device requesting a service may also be a server device, such as 4-server-2, sending 3-in-4, from an application 4-app, a request 3-in-4 to execute service 3-service-4. The request 3-in-4 is handled by the respective abstraction interface 3-abs-int-4, which decides, in conjunction with the management component 110-sys-mng, how to direct the request 3-req-4. The request could be directed 3-dir-5 according to a first criterion to another server 4-server-1 for execution, or it could even be directed 3-dir-4 according to another criterion to a client device such as 3-client-2 for execution.

One embodiment is a system 110-sys operative to migrate execution of services across multiple tiers. The system includes a plurality of client devices 3-client-1, 3-client-2, 3-client-3 constituting a first tier 110-tier-1, in which each of the client devices is associated with an abstraction interface 3-abs-int-1, 3-abs-int-2, 3-abs-int-3. The system further includes at least one server device 4-server-1, 4-server-2 communicatively connected with the client devices 3-client-1, 3-client-2, 3-client-3, in which said at least one server device constitutes a second tier 110-tier-2. The system further includes a management component 110-sys-mng associated with the abstraction interfaces 3-abs-int-1, 3-abs-int-2, 3-abs-int-3.

In one embodiment, each of the client devices (e.g., 3-client-1) is configured to send 3-in-3 a request 3-req-3, via the respective abstraction interface 3-abs-int-1, to execute a service 3-service-3 needed by the client device 3-client-1. The respective abstraction interface 3-abs-int-1 is configured to receive the request 3-req-3 and select, in conjunction with the management component 110-sys-mng and according to at least one criterion, which of the tiers 110-tier-1, 110-tier-2 is to handle the request 3-req-3 using which device (3-client-1, 3-client-2, 3-client-3 in 110-tier-1, or 4-server-1, 4-server-2 in 110-tier-2) in the tier. The system 110-sys is configured to direct (3-dir-1, or 3-dir-2, or 3-dir-3) the request 3-req-3 to the device selected (e.g., 3-dir-1 in case 4-server-1 is selected, 3-dir-2 in case 3-client-3 is selected, and 3-dir-3 in case 3-client- is selected). The device selected (e.g, 4-server-1 in the case of 3-dir-1) is configured the receive the request 3-req-3 and execute the service 3-service-3 @ 4-server-1 accordingly.

In one embodiment, the at least one server device (e.g., 4-server-1) is the device selected, and said direction 3-dir-1 of the request 3-req-3 comprises directing the request into the server device. In one embodiment, the at least one criterion is associated with a complexity of the service 3-service-3 requested, in which said selection of the server device 4-server-1 is associated with an ability of the server device to execute complex services. In one embodiment, the at least one criterion is associated with a power consumption of the client device 3-client-1 making the request 3-req-3, in which said selection of the server device 4-server-1 is associated with a decision to preserve power in the client device making the request.

In one embodiment, one of the client devices (e.g., 3-client-3 or 3-client-1) is the device selected, and said direction of the request 3-req-3 comprises directing the request into the client device selected. In one embodiment, the client device selected (e.g., 3-client-3) is not the client device that has made the request 3-req-3. In one embodiment, the client device selected (e.g., 3-client-1) is the same client device 3-client-1 that has made the request 3-req-3.

In one embodiment, the at least one criterion is associated with a communication bandwidth limitation of the client device 3-client-1 making the request 3-req-3, in which said selection is associated with a decision to preserve communication bandwidth in the client device making the request.

In one embodiment, the at least one criterion is related to a latency requirement associated with the service requested 3-service-3, in which said selection is associated with a decision to reduce a latency associated with transporting the request 3-req-3.

In one embodiment, the at least one criterion is associated with a load-related condition in the server device (e.g., 4-server-1), in which said selection of one of the client devices 3-client-3, 3-client-1 is associated with the load-related condition detected in the server device.

In one embodiment, the at least one criterion is a cost criterion, in which said selection of one of the client devices 3-client-3, 3-client-1 is associated with lower cost of executing the service in one of the client devices as opposed to a higher cost of executing the service in one of the server devices.

In one embodiment, said at least one criterion is associated with at least one of: (i) a complexity associated with the service 3-service-3 requested, (ii) a communication bandwidth associated with the client device 3-client-1 making the request 3-req-3, (iii) a power consumption limitation associated with the client device 3-client-1 making the request 3preq-3, (iv) a latency requirement associated with the service 3-service-3 requested, (v) a cost criterion, in which the selection is operative to reduce a cost associated with executing the service 3-service-3, (vi) a proximity of a code segment 2-code-3 to the device selected, in which the code segment is required for the execution of the service 3-service-3, (vii) a proximity of a data set 2-dat-3 to the device selected, in which the data set is required as an input for the service 3-service-3, (vii) a load condition at the target device selected, in which the request is not directed to target devices that are overloaded, and (viii) a type of the target device selected, in which the target device selected is of the type optimized to execute a certain category of services.

In one embodiment, the service 3-service-3 requested in a microservice, and the system 110-sys constitutes at least a part of a system implementing a microservice architecture.

In one embodiment, the request 3-req-3 is associated with a remote procedure call (RPC).

In one embodiment, at least one of the client devices 3-client-1 is a mobile wireless device such as a smartphone, a tablet, a car, or an internet-of-things (IoT) device. In one embodiment, the mobile wireless device 3-client-1 executes a mobile application, in which the mobile application is the one initiating the request 3-req-3 for the service 3-service-3 which is needed by the mobile application.

In one embodiment, said selection is done according to a bid, in which the device selected is one of the devices associated with a better response to the bid, and in which the at least one criterion is associated with said response. In one embodiment, said better response is associated with a better latency offered, a better price offered, or a combination thereof in conjunction with said execution of the service 3-service-3.

On embodiment further comprises at least one data store 3-DS-3, 4-DS-1, in which at least one of said data stores (e.g., 3-DS-3) is operative to store a code segment 2-code-3 needed for said execution of the service 3-service-3, wherein said at least one criterion is associated with a proximity of the code segment 2-code-3 to the device selected, so as to minimize a cost, bandwidth, or latency associated with making the code segment available to the device selected. In one embodiment, the code segment 2-code-3 is stored in one of the data stores (e.g., 3-DS-3) that is located in the device selected (e.g., 3-client-3), in which the code segment 2-code-3 and the associated service 3-service-3 are a stored procedure in the device selected. In one embodiment, the code segment 2-code-3 is not stored in the device selected, and the system 110-sys is configured to transport the code segment from the respective data store (e.g., 3-DS-3) into the device selected.

One embodiment further comprises at least one data store 3-DS-3, 4-DS-1, in which at least one of said data stores (e.g., 4-DS-1) is operative to store a data set 2-dat-3 needed as input for said execution of the service 3-service-3, wherein said at least one criterion is associated with a proximity of the data set 2-dat-3 to the device selected (e.g., 4-server-1), so as to minimize a cost, bandwidth, or latency associated with making the data set available to the device selected. In one embodiment, the data set 2-dat-3 is stored in one of the data stores (e.g., 4-DS-1) that is located in the device selected. In one embodiment, the data set 2-dat-3 is not stored in the device selected, and the system 110-sys is configured to transport the data set from the respective data store (e.g., 4-DS-1) into the device selected.

In one embodiment, at least one of the client devices (e.g., 3-client-1) is a server computer, in which the request 3-req-3 for the service 3-service-3 is originated by an application 3-app running on the server computer.

Figure 4:
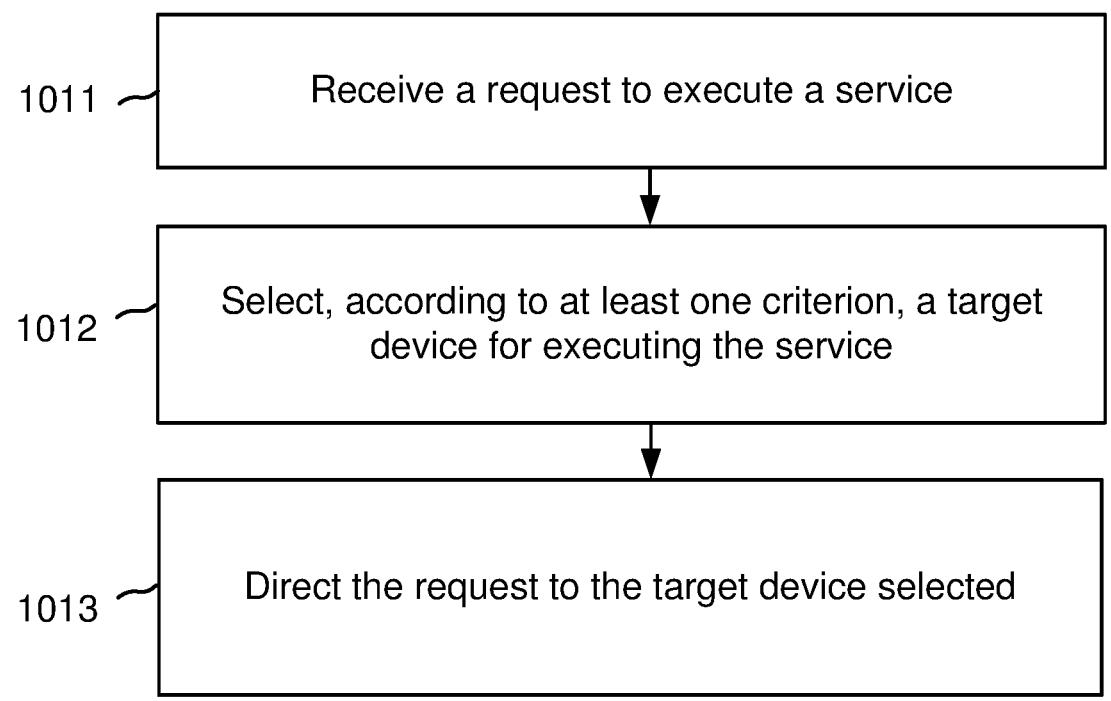
FIG. 4 illustrates one embodiment of a method for selecting targets for executing requested services.

FIG. 4 illustrates one embodiment of a method for selecting targets for executing services. The method includes: In step 1011, receiving (3-in-3 or 3-in-4), by an abstraction interface (3-abs-int-1 or 3-abs-int-4 respectively) associated with a first device (3-client-1 or 4-server-2 respectively), from an application program (3-app or 4-app respectively) running in the first device, a request (3-req-3 or 3-req-4 respectively) to execute a service (3-service-3 or 3-service-4 respectively) needed by the application program, in which said execution of the service requires a first data component 2-code-3, or 2-dat-3, or both. In step 1012, selecting, according to at least one criterion, by the abstraction interface (e.g., 3-abs-int-1), a target device (e.g., one of 3-client-1, 3-client-2, 3-client-3, 4-server-1, 4-server-2) for executing the service 3-service-3. In step 1013, directing (e.g., one of 3-dir-1, 3-dir-2, 3-dir-3) the request 3-req-3, by the abstraction interface, to the target device selected.

In one embodiment, said at least one criterion is associated with at least one of: (i) a complexity associated with the service 3-service-3, 3-service-4 requested, (ii) a communication bandwidth associated with the first device 3-client-1, 4-server-4 making the request 3-req-3, 3-req-4, (iii) a power consumption limitation associated with the first device 3-client-1, 4-server-2 making the request 3preq-3, 3-req-4, (iv) a latency requirement associated with the service 3-service-3, 3-service-4 requested, (v) a cost criterion, in which the selection is operative to reduce a cost associated with executing the service 3-service-3, 3-service-4, (vi) a proximity of the data component to the target device selected, (vii) a load condition at the target device selected, in which the request is not directed to target devices that are overloaded, and (viii) a type of the target device selected, in which the target device selected is of the type optimized to execute a certain category of services.

In one embodiment, said selection is done independently by the abstraction interface 3-abs-int-1, 3-abs-int-4.

In one embodiment, said selection is done by the abstraction interface 3-abs-int-1, 3-abs-int-4 in conjunction with a management component 110-sys-mng that is either in the first device 3-client-1, 4-server-2 or outside the first device. In one embodiment, said abstraction interface 3-abs-int-1, 3-abs-int-4 may be either in the first device 3-client-1, 4-server-2 or outside the first device. The abstraction interface may even be in one of the target devices, and in such a case, the target device is the one directing the request to another target device for execution.

One embodiment further comprises: instructing, by the abstraction interface 3-abs-int-1, 3-abs-int-4 or a management component 110-sys-mng associated therewith, a transport of the data component 2-code-3, or 2-dat-3, or both from a first data store in which the data component is stored, to a second data store located in a vicinity to the target device selected. For example, if the target device is selected to be 3-client-3, then 2-dat-3 is transported from 4-DS-1 to 3-DS-3. If the target device is selected to be 4-server-1, then 2-code-3 is transported from 3-DS-3 to 4-DS-1.

In one embodiment, the data component 2-code-3, or 2-dat-3, or both is either a code segment 2-code-3 needed for said execution of the service 3-service-3, or a data set 2-dat-3 required as an input for said execution of the service.

In one embodiment, said target device is selected from a group consisting of: (i) the first device itself, (ii) a server device, (iii) a mobile wireless device, and (iv) another device similar to the first device.

In one embodiment, said directing is transparent, so as to re-use the request 3-req-3, 3-req-4 itself. In one embodiment, said directing comprises modifying the request 3-req-3, 3-req-4 according to the target device selected, in which the request prior to said modification is inadequate or is incorrect to be sent in an original form to the target device selected.

In one embodiment, said first device is selected from a group consisting of: (i) a server device, (ii) a mobile wireless device, and (iii) another device similar to the target device.

Figure 5:
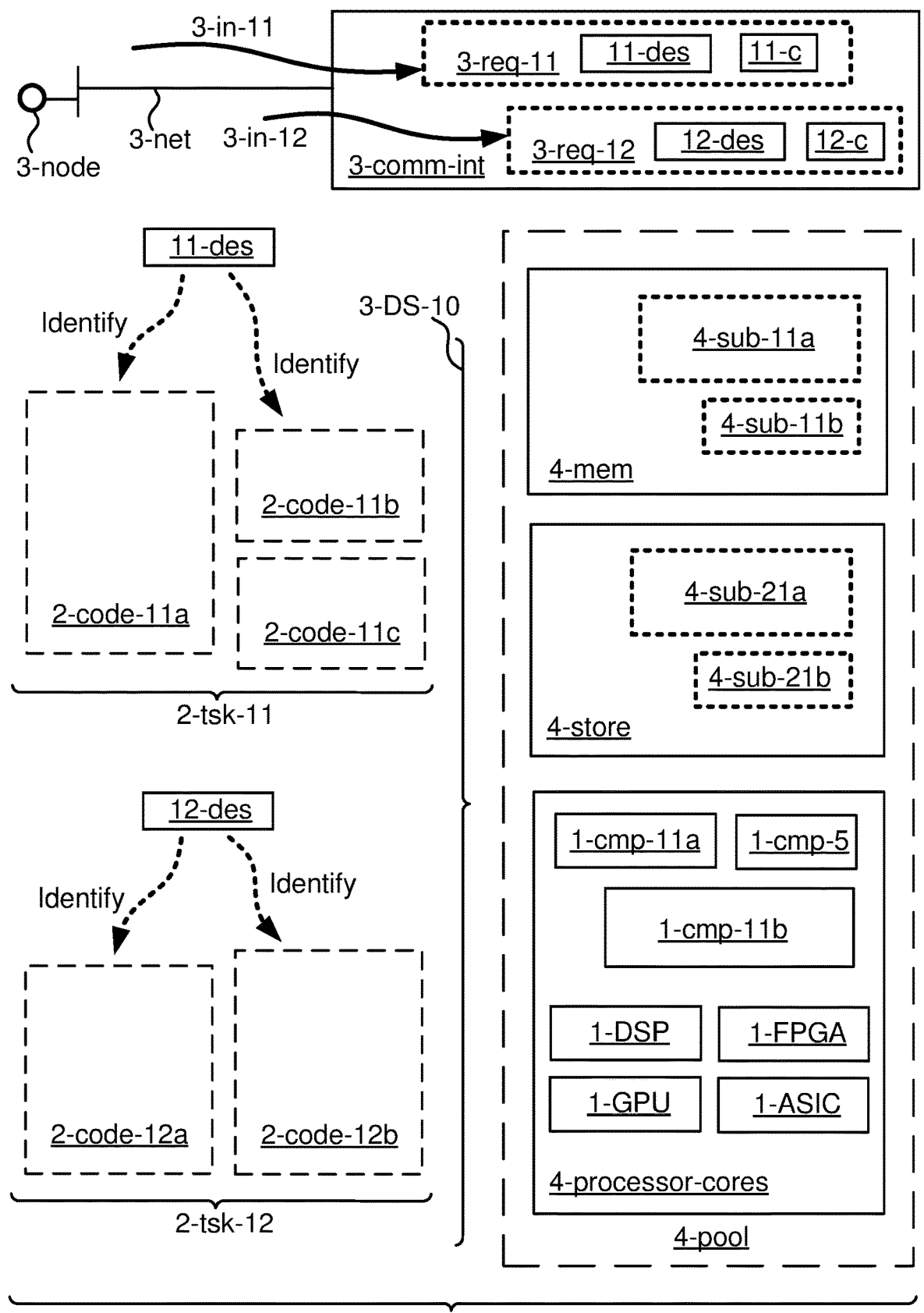
FIG. 5 illustrates one embodiment of a system operative to select a particular code segment for executing a specific task while complying with a certain execution constraint and further operative to select particular code segments for executing specific tasks.

FIG. 5 illustrates one embodiment of a system 120-sys operative to select a particular code segment for executing a specific task while complying with a certain execution constraint, and further operative to select particular code segments for executing specific tasks. The system 120-sys could be a server, a data center, a cluster of computers, or any physical device capable of hosting and maintaining a pool 4-pool of computational resources and a database/datastore 3-DS-10 capable of storing code segments. In one embodiment, the system 120-sys receives 3-in-11, 3-in-12 requests 3-req-11, 3-req-12 for executing specific tasks 2-tsk-11, task 2-tsk-12, then analyzes current computational resources 4-mem, 4-store, 4-processor-cores available for executing the tasks, and then selects code segments 2-code-11a, 2-code-11b, 2-code-11c, 2-code-12a, 2-code-12b for executing the tasks, in which the selection of the code segments is done in a way that optimizes allocation of the various computational resources among the tasks, and such that said optimization is directed and facilitated by taking into consideration constraints and guidelines 11-c, 12-c associated with the requests 3-req-11, 3-req-12. The requests 3-req-11, 3-req-12 may be received in the system via a communication interface 3-comm-int communicatively connected with a requesting source or sources 3-node via a communication network 3-net of some sort. Each of the tasks 2-tsk-11, task 2-tsk-12 (two tasks are shown by way of example) is associated with at least two code segments, in which each of the code segments is operative to execute the same respective task. For example, the task 2-tsk-11 can be executed using any one of at least two possible code segments 2-code-11a, 2-code-11b, 2-code-11c (three code segments are shown by way of example), and the task 2-tsk-12 can be executed using any one of at least two possible code segments 2-code-12a, 2-code-12b (two code segments are shown by way of example). Per a given task, different code segments operative to execute the task are associated with different computational resources needed for such execution. For example, for executing task 2-tsk-11 using code segment 2-code-11a, a certain memory size or type 4-sub-11a, a certain storage size or type 4-sub-21a, and a certain number or type of processors or processor cores 1-com-11a (also referred to as compute elements) are needed. However, for executing the same task 2-tsk-11 using another code segment such as 2-code-11b, a certain other memory size or type 4-sub-11b, a certain other storage size or type 4-sub-21b, and a certain other number or type of processors 1-com-11b are needed. The logical, functional, or mathematical result of executing 2-tsk-11 using the code segment 2-code-11a is the same as the result of executing 2-tsk-11 using the code segment 2-code-11b, but different resources are utilized by each of the code segments. Similarly, 2-tsk-11 can also be executed using the code segment 2-code11c which utilizes yet another sub-set of the resources comprising, as an example, the digital-signal-processor 1-DSP. Therefore, the selection of specific code segments in turn affects utilization of the computational resources. Guidelines 11-c, 12-c such as latency requirements, cost constraints, and specific sources of code may be considered when selecting code segments in conjunction with resource availability.

In one embodiment, each of the requests 3-req-11, 3-req-12 includes a description of the requested task 11-des, 12-des (also referred to as a contract), via which the requestor is able to "define" the task to be executed. For example, the request 3-req-11 may describe 11-des a task 2-tsk-11, in which the description 11-des may say "count the number of words in a certain web-page", without specifying how exactly task 2-tsk-11 is to be executed, or how exactly the web-page should be accessed and words counted. The system 120-sys then identifies, using the description 11-des, all code segments that are operative to "count the number of words in a certain web-page", in which identification is achieved perhaps using metadata associated with each of the code segments. In such a manner, the code segments 2-code-11a, 2-code-11b, 2-code-11c are identified as the code segments able to perform the task 2-tsk-11 of counting the number of words in a certain web-page, in which each of the code segments identified is a different implementation of counting the words, and each of the implementations is possibly utilizing different resources to achieve such counting. The needed resources to count the words may be listed in association with each of the code segments as respective metadata. In a similar manner, the request 3-req-12 may describe 12-des a task 2-tsk-12, in which the description 12-des may say "multiply two matrices A and B", without specifying how exactly task 2-tsk-12 is to be executed, or how exactly the matrices should be stored and multiplied. The system 120-sys then identifies, using the description 12-des, all code segments that are operative to "multiply two matrices A and B", which in this case are the code segments 2-code-12a, 2-code-12b.

In one embodiment, a request 3-req-11 is received 3-in-11 to execute a task 2-tsk-11 having the description 11-des and associated with a constraint 11-c. For example, the constraint 11-c may be a requirement to execute task 2-tsk-11 within a predetermined period of time. The system 120-sys identifies three code segments that could be used to implement task 2-tsk-11: 2-code-11a, 2-code-11b, 2-code-11c, and the system further determines, per each of the code segments identified, a system constraint associated with allocating the respective resources. For example, the system 120-sys may determine that the resources 4-sub-11a, 4-sub-21a, 1-com- 11a (also referred to as a sub-set of resources) needed by code segment 2-code-11a to implement task 2-tsk-11 will currently take too long to be allocated, and therefore not be available on time to comply with 11-c, perhaps because 4-sub-11a is a big chunk of memory, and currently the memory resources 4-mem are running low. The system may further determine that the sub-set 4-sub-11b, 4-sub-21b, 1-com-11b needed by code segment 2-code-11b to implement task 2-tsk-11 can currently be allocated essentially immediately, perhaps because 4-sub-11b is a smaller chunk of memory, or perhaps because 4-sub-11b is a different type of memory as compared with 4-sub-11a. Since the constraint 11-c calls for the execution of task 2-tsk-11 within a predetermined period of time, the system can now rule out executing code segment 2-code-11a, and flag code segment 2-code-11b as a more realistic candidate for executing task 2-tsk-11 while complying with constraint 11-c. The system 120-sys may still consider using the code segment 2-code-11c for executing task 2-tsk-11, as it requires the DSP 1-DSP, and perhaps other resources, which are currently available for quick allocation. Therefore, the system 120-sys may also flag the code segment 2-code-11c as a candidate for executing 2-tsk-11. Now, after ruling out using 2-code-11a in view of c-11 and in view of currently available resources, the system has to decide which of the remaining code segment 2-code-11b, 2-code-11c to actually execute. The system 120-sys may now consider other constraints, such as the cost of allocating the different resources. For example, the system may decide that allocating the DSP 1-DSP is more expensive than allocating the general purpose processor 1-cmp-11b, and therefore select code segment 2-code-11b for the actual execution task 2-tsk-11. In another example, the constraint 11-c could be associated with a requirement to execute task 2-tsk-11 at a minimal cost, and in that case the system 120-sys may select code segment 2-code-11a, perhaps because it is more cost effective to utilize processor 1-cmp-11a as compared with utilizing processor 1-cmp-11b, even though executing 2-code-11a will take much longer. In other examples, the constraint 11-c may be associated with other aspects, such as an origin of the code segments, a requirement to utilize open source code, and other aspects.

In one embodiment, a request 3-req-11 is received 3-in-11 to execute a task 2-tsk-11 having the description 11-des and associated with a constraint 11-c, and a request 3-req-12 is received 3-in-12 to execute a task 2-tsk-12 having the description 12-des and associated with a constraint 12-c. For example, the constraint 11-c may be a requirement to execute task 2-tsk-11 at a certain cost or lower, and the constraint 12-c may be a requirement to execute task 2-tsk-12 using a specific code provider. The system 120-sys identifies two code segments that could be used to implement task 2-tsk-11: 2-code-11a, 2-code-11c, and the system further identifies two code segments that could be used to implement task 2-tsk-12: 2-code-12a, 2-code-12b. Now, the system has to execute both tasks 2-tsk-11, 2-tsk-12 at the same time, so the question becomes how to split the available resources between the two tasks. For example, in conjunction with executing both 2-tsk-11 and task 2-tsk-12, it may be assessed that from the pool of processors 4-processor-cores, only 1-DSP and 1-cmp-11a are currently available. Since both 2-code-11c (associated with executing 2-tsk-11) and 2-code-12b (associated with executing 2-tsk-12) need 1-DSP to be executed, they can't be run simultaneously. Similarly, since both 2-code-11a (associated with executing 2-tsk-11) and 2-code-12a (associated with executing 2-tsk-12) need 1-cmp-11a to be executed, they also can't be run simultaneously. However, 2-code-11c (associated with executing 2-tsk-11) can be executed simultaneously with 2-code-12a (associated with executing 2-tsk-12) since they use different processors (1-DSP and 1-cmp-11a respectively), and similarly, 2-code-11a (associated with executing 2-tsk-11) can be executed simultaneously with 2-code-12b (associated with executing 2-tsk-12) since they also use different processors (1-cmp-11a and 1-DSP respectively). Therefore, the system will rule out executing 2-code-11c and 2-code-12b simultaneously, and also rule out executing 2-code-11a and 2-code-12a simultaneously. But the system still has two options here—the first is to execute 2-code-11c and 2-code-12a simultaneously, and the second is to execute 2-code-11a and 2-code-12b simultaneously. In order to resolve which of the two possibilities to select, the system may consider the two constraints 11-c, 12-c associated respectively with the two requested tasks 2-tsk-11, task 2-tsk-12: in one case, if 11-c calls for the execution of 2-tsk-11 at a certain cost or lower, while 12-c is silent regarding how expensive should it be to execute 2-tsk-12, then, assuming 1-DSP facilitates a more cost effective execution than 1-com-11a, the system will select the option so execute 2-code-11c and 2-code-12a simultaneously, and thereby assuring that 2-tsk-11 is executed cost effectively using the cheaper 1-DSP via running 2-code-11c, while 2-tsk-12 is executed using 1-cmp-11a via running 2-code-12a. The system may also make sure that the code segment 2-code-12b is indeed provided by a code provider as constrained by 12-c, and if not, then another combination of other code segments may be selected, such that eventually both system constraints, such as resource availability, and the specific requested constraints 11-c, 12-c, are met. In other examples, the constrain 11-c, 12-c may be associated with other aspects, such as an origin of the code segments, a requirement to utilize open source code, and other aspects.

The pool 4-pool of computational resources may include several kinds of resources, such as: memory 4-mem (e.g., random-access-memory, DRAM, flash memory, etc.), storage 4-store (e.g., hard disks, flash disks, etc.), processors, processor cores 4-processor-cores (also referred to as compute elements), or related hardware associated with: digital-signal-processors (DSP) 1-DSP, field-programmable-gate-arrays (FPGA) 1-FPGA, graphical-processing-units (GPU) 1-GPU, and dedicated application-specific-integrated-chips (ASIC) 1-ASIC. Other kinds of recourses, such as input-output (10) resources are also possible. The resources may be located in one specific place or device, such as a server or a data center, or they may be distributed over different locations, and in some cases in a cloud configuration. The resources may even be distributed among peer-to-peer devices.

The database/data-store 3-DS-10 could be based on volatile memory, non-volatile memory, or any kind of medium operative to store the data segments. The database/data-store 3-DS-10 may be located in one specific place or device, such as a server or a data center, or it may be distributed over different locations, and in some cases in a cloud configuration. The database/data-store 3-DS-10 may even be distributed among peer-to-peer devices. The database/data-store 3-DS-10 may be co-located with the pool of resources 4-pool, or it may be physically detached.

The logic and operation of the system 120-sys may be facilitated by hardware elements not shown, or they may be facilitated by some constant or changing elements in the pool 4-pool of resources.

In one embodiment, the constraints 11-c, 12-c are received in the system 120-sys as part of the requests 3-req-11, 3-req-12. In one embodiment, the constraints 11-*c*, 12-*c* are assigned by the system 120-sys. In one embodiment, each of the requests is associated with a respective constraint. In one embodiment, several requests are associated with a single constraint (say 11-*c*), in which the single constraint is received in conjunction with the requests, or it may be decided internally by the system 120-sys.

In one embodiment, the requests 3-req-11, 3-req-12 are generated outside the system 120-sys. In one embodiment, the requests 3-req-11, 3-req-12 are generated by the system 120-sys internally.

In one embodiment, the requests 3-req-11, 3-req-12 are in a form of a remote-procedure-call (RPC), or in a form of a derivative thereof.

In one embodiment, the system 120-sys handles more than 1,000 (one thousand) requests such as 3-req-11, 3-req-12 simultaneously. In one embodiment, the system 120-sys receives and handles more than 10,000 (ten thousand) requests such as 3-req-11, 3-req-12 per second.

Figure 6A:
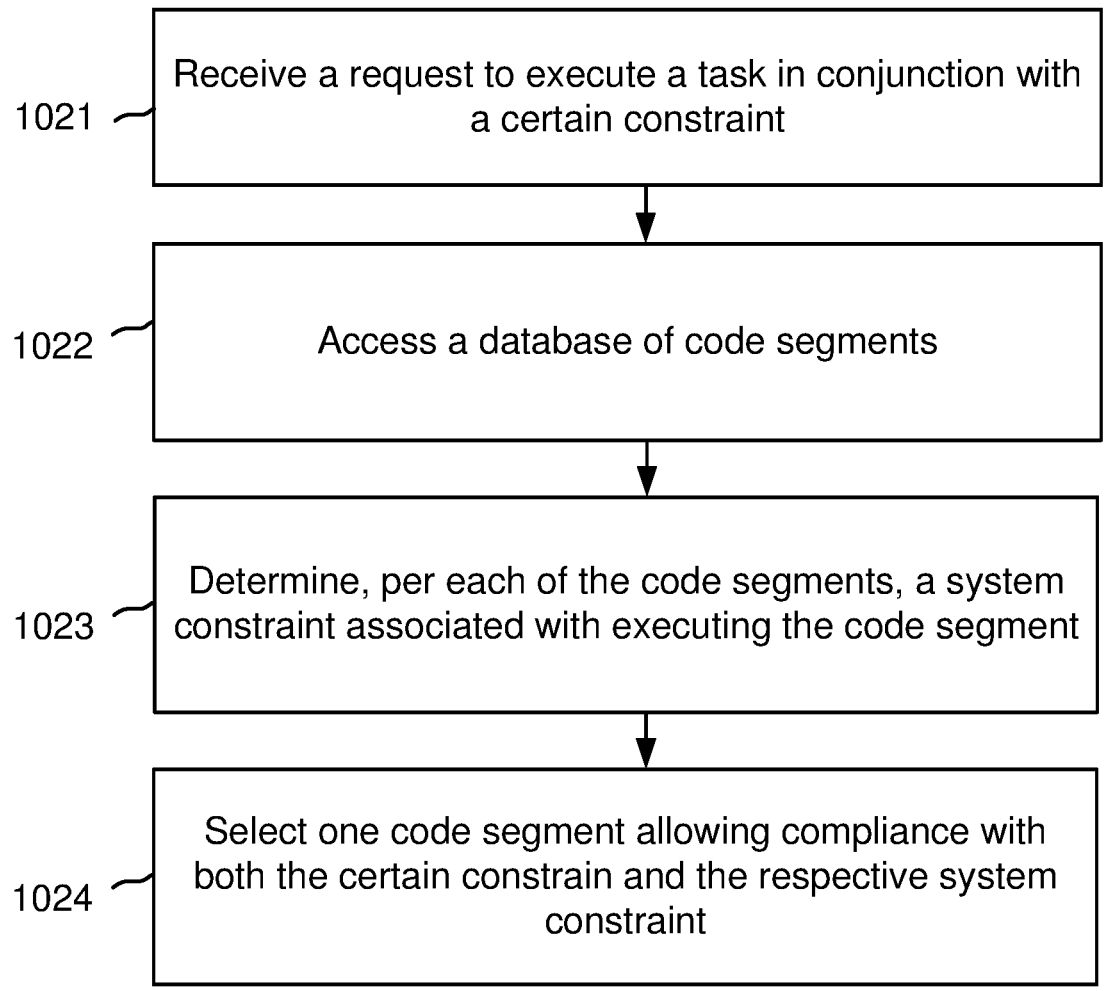
FIG. 6A illustrates one embodiment of a method for selecting a particular code segment for executing a specific task while complying with a certain execution constraint.

FIG. 6A illustrates one embodiment of a method for selecting a particular code segment for executing a specific task while complying with a certain execution constraint. The method includes: In step 1021, receiving 3-in-11*a* request 3-req-11 to execute a specific task 2-tsk-11, in which said execution is required to comply with at least one certain constraint 11-*c*. In step 1022, accessing a database/data store 3-DS-10 comprising a plurality of code segments 2-code-11*a*, 2-code-11*b*, 2-code-12*a*, 2-code-12*b*, in which at least two of the code segments in the database 2-code-11*a*, 2-code-11*b* are operative to facilitate execution of the specific task 2-tsk-11 requested, and in which each of the code segments 2-code-11*a*, 2-code-11*b*, 2-code-12*a*, 2-code-12*b* requires a respective sub-set of physical computational resources to be successfully executed. For example, out of a pool 4-pool of physical computational resources that may include memory 4-mem, storage 4-store, and processors 4-processor-cores, the code segment 2-code-11*a* may require the following sub-set of resources to be successfully executed: a certain memory size or type 4-sub-11*a*, a certain storage size or type 4-sub-21*a*, and a certain number or type of processors or processor cores 1-com-11*a* also referred to as compute elements. The code segment 2-code-11*b*, which is also operative to execute the specific task 2-tsk-11, may require a totally different sub-set of resources: for example, code segment 2-code-11*b* may require a certain other memory size or type 4-sub-11*b*, a certain other storage size or type 4-sub-21*b*, and a certain other number or type of processors 1-com-11*b*. In step 1023, determining, per each of the at least two code segments 2-code-11*a*, 2-code-11*b*, and given a current state of physical computational resources availability, a system constraint arising in conjunction with allocating the respective sub-set of physical computational resources. For example, in a given state of physical computational resources availability, in which memory 4-mem is almost fully utilized, the system may be practically unable (constrained in a certain way) to allocate 4-sub-11*a* for execution of 2-code-11*a*, but the system could relatively easily allocate 4-sub-11*b* for execution of 2-code-11*b*, perhaps because 4-sub-11*b* is smaller in size than 4-sub-11*a*. In step 1024, selecting, out of the at least two code segments 2-code-11*a*, 2-code-11*b*, one particular code segment (e.g., 2-code-11*b*) that allows compliance with the certain constraint 11-*c* in view of the respective system constraint. For example, if the certain constraint 11-*c* calls for fast execution of the specific task 2-tsk-11, then the system may decide to execute the specific task 2-tsk-11 by running code segments 2-code-11*b*, instead of running code segments 2-code-11*a*, since it was determined that the system is currently constrained in conjunction with allocating 4-sub-11*a* for the execution of 2-code-11*a*, but it was also determined that the system is currently less constrained in conjunction with allocating 4-sub-11*b* for the execution of 2-code-11*b*.

In one embodiment, said certain constraint 11-*c* is a requirement to successfully complete execution of the specific task 2-tsk-11 within a predetermined period of time; and said system constraint is a required period of time determined to be needed for successful allocation of the respective sub-set of physical computational resources, in which said required period of time is shorter than the predetermined period of time, and thereby allowing said compliance with the certain constraint 11-*c*. For example, it may be determined that allocating the sub-set 4-sub-11*a*, 4-sub-21*a*, 1-com-11*a* for executing 2-code-11*a* would take longer than required by the certain constraint 11-*c*, but it may also be determined that allocating the sub-set 4-sub-11*b*, 4-sub-21*b*, 1-com-11*b* for executing 2-code-11*b* would be quicker than required by the certain constraint 11-*c*, and therefore the code segment 2-code-11*b* is the one selected for executing the specific task 2-tsk-11.

In one embodiment, said certain constraint 11-*c* is a requirement to successfully complete execution of the specific task 2-tsk-11 at a specific cost or lower; and said system constraint is a cost determined to be associated with successfully allocating the respective sub-set of physical computational resources, in which said cost determined is lower than the specific cost. For example, it may be determined that allocating compute element 1-com-11*a* for executing 2-code-11*a* would be more expensive than required by the certain constraint 11-*c*, but it may also be determined that allocating compute element 1-com-11*b* for executing 2-code-11*b* would be less expensive than required by the certain constraint 11-*c*, and therefore the code segment 2-code-11*b* is the one selected for executing the specific task 2-tsk-11. In one embodiment, said cost determined is a cost associated with operating the respective sub-set of physical computational resources associated with the particular code segment selected. In one embodiment, said cost determined is an outcome of a bid placed and won by a hardware provider of the respective sub-set of physical computational resources associated with the particular code segment selected.

In one embodiment, said certain constraint 11-*c* is a requirement to successfully complete execution of the specific task 2-tsk-11 at a specific cost or lower; and said system constraint is a feasibility of successfully allocating the respective sub-set of physical computational resources, in which the particular code segment selected is a code segment that is both: (i) associated with a respective cost that is lower than the specific cost, and (ii) associated with the respective sub-set of physical computational resources having a feasibility of being successfully allocated given the current state of physical computational resources availability. For example, it may be determined that code segment 2-code-11*b* is the only code for which: (i) the respective required sub-set of resources 4-sub-11*b*, 4-sub-21*b*, 1-com-11*b* is in a technical condition for being currently allocated, and (ii) a cost associated therewith is lower than the specific cost, and therefore the code segment 2-code-11*b*, which answers both criteria (i.e., technical and cost), is the one selected for executing the specific task 2-tsk-11. In one embodiment, said respective cost is determined by a provider of the particular code segment selected 2-code-11*b*. In one embodiment, said determination of the respective cost is resolved via bidding, in which the provider of the particular code segment selected 2-code-11b has placed a bid that is lower than other bids from other providers associated with other code segments operative to facilitate execution of the specific task 2-tsk-11 requested.

In one embodiment, said certain constraint 11-c is a requirement to use a code segments associated with at least one of: (i) a certain type of code license, (ii) an open source origin, (iii) a closed source origin, (iv) a specific author, publisher, or provider, (v) a certain publish date or a range of dates, and (vi) a certain update date or a range of dates; and said system constraint is a feasibility of successfully allocating the respective sub-set of physical computational resources, in which the particular code segment selected is a code segment that is both: (i) complying with said requirement, and (ii) associated with the respective sub-set of physical computational resources having a feasibility of being successfully allocated given the current state of physical computational resources availability.

One embodiment is a system 120-sys operative to select a particular code segment for executing a specific task while complying with a certain execution constraint. The system includes: a pool 4-pool of physical computational resources 4-mem, 4-store, 4-processor-cores; and a database 3-DS-10 comprising a plurality of code segments 2-code-11a, 2-code-11b, 2-code-12a, 2-code-12b, in which at least two of the code segments in the database 2-code-11a, 2-code-11b are operative to facilitate execution of a specific task 2-tsk-11, and in which each of the code segments requires a respective sub-set of physical computational resources, out of the pool of physical computational resources 4-pool, to be successfully executed.

In one embodiment, the system 120-sys is configured to: receive 3-in-11a request 3-req-11 to execute the specific task 2-tsk-11, in which said execution is required to comply with at least one certain constraint 11-c; access the at least two code segments 2-code-11a, 2-code-11b in the database 3-DS-10; determine, per each of the at least two code segments 2-code-11a, 2-code-11b, and given a current state of physical computational resources 4-mem, 4-store, 4-processor-cores availability in the pool 4-pool, a system constraint arising in conjunction with allocating the respective sub-set of physical computational resources; and select, out of the at least two code segments 2-code-11a, 2-code-11b, one particular code segment (e.g., 2-code-11b) that allows compliance with the certain constraint 11-c in view of the system constraint associated with said one particular code segment selected. For example, 2-code-11b is selected because allocation of the respective sub-set 4-sub-11b, 4-sub-21b, 1-com-11b was determined to be associated with an allocation constraint that still allows compliance with the certain constraint 11-c; i.e., the allocation/system constraint associated with allocating the respective sub-set 4-sub-11b, 4-sub-21b, 1-com-11b was determined to be such a constraint that is not preventing the system from complying with the certain constraint 11-c.

In one embodiment, the system if further configured to: allocate the sub-set of physical computational resources (e.g., 4-sub-11b, 4-sub-21b, 1-com-11b) associated with the one particular code segment selected (e.g., 2-code-11b), in which said allocation is done in conjunction with the respective system constraint; and execute the one particular code segment selected 2-code-11b, using the sub-set of physical computational resources just allocated 4-sub-11b, 4-sub-21b, 1-com-11b, thereby facilitating compliance with the certain constraint 11-c while operating within the respective system constraint.

Figure 6B:
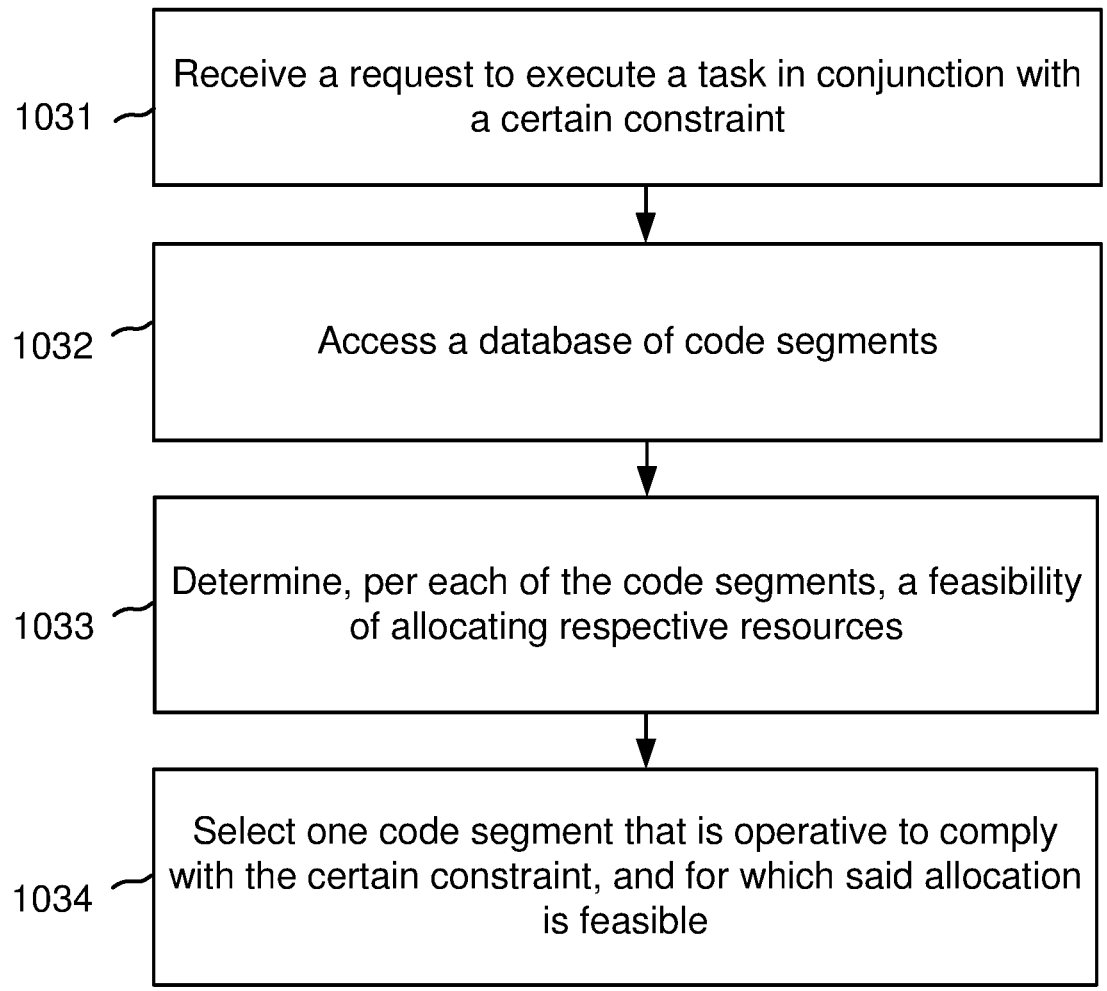
FIG. 6B illustrates another embodiment of a method for selecting a particular code segment for executing a specific task while complying with a certain execution constraint.

FIG. 6B illustrates one embodiment of a method for selecting a particular code segment for executing a specific task while complying with a certain constraint. The method includes: In step 1031, receiving 3-in-11a request 3-req-11 to execute a specific task 2-tsk-11, in which said execution is required to comply with at least one certain constraint 11-c. In step 1032, accessing a database 3-DS-10 comprising a plurality of code segments 2-code-11a, 2-code-11b, 2-code-12a, 2-code-12b, in which at least two of the code segments in the database 2-code-11a, 2-code-11b are operative to facilitate execution of the specific task requested 2-tsk-11, and in which each of the code segments requires a respective sub-set of physical computational resources to be successfully executed. In step 1033, determining, per each of the at least two code segments 2-code-11a, 2-code-11b, and given a current state of physical computational resources 4-mem, 4-store, 4-processor-cores availability, a feasibility of successfully allocating the respective sub-set of physical computational resources. In step 1034, selecting, out of the at least two code segments 2-code-11a, 2-code-11b, one particular code segment for which: (i) successful allocation of the respective sub-set of physical computational resources was determined to be feasible, and (ii) using the particular code segment, given successful allocation of the respective sub-set of physical computational resources, is operative to comply with the certain constraint 11-c.

In one embodiment, said certain constraint 11-c is a requirement to successfully complete execution of the specific task 2-tsk-11 within a predetermined period of time; and said feasibility is a feasibility of successfully allocating the respective sub-set of physical computational resources within a period of time that is shorter than the predetermined period of time.

In one embodiment, said certain constraint 11-c is a requirement to successfully complete execution of the specific task 2-tsk-11 at a specific cost or lower; and said feasibility is a feasibility of successfully allocating the respective sub-set of physical computational resources at a cost that is lower than the specific cost.

One embodiment is a system 120-sys operative to select particular code segments for executing specific tasks. The system includes: a pool 4-pool of physical computational resources 4-mem, 4-store, 4-processor-cores; and a plurality of code segments 2-code-11a, 2-code-11c, 2-code-12a, 2-code-12b, in which: (i) each of the code segments is operative to facilitate execution of a specific task (e.g., 2-code-11a and 2-code-11c are each operative to facilitate execution of task 2-tsk-11, and 2-code-12a and 2-code-12b are each operative to facilitate execution of task 2-tsk-12), and (ii) for any given specific task there are at least two possible code segments able to facilitate execution thereof (e.g., task 2-tsk-11 has at least two possible code segments 2-code-11a, 2-code-11c, and task 2-tsk-12 has at least two possible code segments 2-code-12a, 2-code-12b), in which each of the possible code segments requires a different sub-set of physical computational resources, out of the pool 4-pool of physical computational resources 4-mem, 4-store, 4-processor-cores, to be successfully executed. For example, the code segment 2-code-11a requires a sub-set comprising 1-cmp-11a to be successfully executed, the code segment 2-code-11c requires a sub-set comprising the digital-signal-processor 1-DSP to be successfully executed, the code segment 2-code-12a requires a sub-set comprising 1-cmp-11a to be successfully executed, and the code segment 2-code-12b requires a sub-set comprising 1-DSP to be successfully executed.

In one embodiment, the system 120-sys is configured to receive 3-in-11, 3-in-12 a plurality of requests 3-req-11, 3-req-12 associated respectively with a plurality of constraints 11-c, 12-c, in which each of the requests is a request to execute a specific one of the tasks while complying with the respective constraint. For example, request 3-req-11 is a request to execute task 2-tsk-11 while complying with constraint 11-c, and request 3-req-12 is a request to execute task 2-tsk-12 while complying with constraint 12-c; and the system 120-sys is further configured to dynamically assess current availability of physical computational resources, out of the pool 4-pool of physical computational resources 4-mem, 4-store, 4-processor-cores, and select, per each of the requests 3-req-11, 3-req-12 and the respective task 2-tsk-11, task 2-tsk-12, a specific one of the at least two code segments able to facilitate execution thereof, in which said plurality of selections, as a whole, are made to results in a respective plurality of sub-sets of physical computational resources that are together optimized to fit within said physical computational resources currently available, while each of the selections is also made to specifically result in the respective sub-set of physical computational resources that is operative to facilitate compliance with the respective constraint. For example, in conjunction with executing both 2-tsk-11 and task 2-tsk-12, it may be assessed that from the pool of processors 4-processor-cores, only 1-DSP and 1-cmp-11a are currently available. Since both 2-code-11c (associated with executing 2-tsk-11) and 2-code-12b (associated with executing 2-tsk-12) need 1-DSP to be executed, they can't be run simultaneously. Similarly, since both 2-code-11a (associated with executing 2-tsk-11) and 2-code-12a (associated with executing 2-tsk-12) need 1-cmp-11a to be executed, they also can't be run simultaneously. However, 2-code-11c (associated with executing 2-tsk-11) can be executed simultaneously with 2-code-12a (associated with executing 2-tsk-12) since they use different processors (1-DSP and 1-cmp-11a respectively), and similarly, 2-code-11a (associated with executing 2-tsk-11) can be executed simultaneously with 2-code-12b (associated with executing 2-tsk-12) since they also use different processors (1-cmp-11a and 1-DSP respectively). Therefore, the system will rule out executing 2-code-11c and 2-code-12b simultaneously, and also rule out executing 2-code-11a and 2-code-12a simultaneously. But the system still has two options here—the first is to execute 2-code-11c and 2-code-12a simultaneously, and the second is to execute 2-code-11a and 2-code-12b simultaneously. In order to resolve which of the two possibilities to select, the system will consider the two constraints 11-c, 12-c associated respectively with the two requested tasks 2-tsk-11, task 2-tsk-12: in one case, if 11-c calls for a fast execution of 2-tsk-11, while 12-c is silent regarding how fast 2-tsk-12 should be executed, then, assuming 1-DSP facilitates faster execution than 1-com-11a, the system will select the option so execute 2-code-11c and 2-code-12a simultaneously, and thereby assuring that 2-tsk-11 is executed using the faster 1-DSP via running 2-code-11c, while 2-tsk-12 is executed using the slower processor 1-cmp-11a via running 2-code-12a.

In one embodiment, said physical computational resources currently available comprise at least two types of physical computational resources; and at least one of the selections is made to result in the respective sub-set of physical computational resources being of a specific one of the types that is operative to facilitate said compliance with the respective constraint. In one embodiment, said constraint (e.g., 11-c), associated with the at least one of the selections (e.g., the selection of 2-code-11c for executing 2-tsk-11), is a requirement to successfully complete execution of the respective task 2-tsk-11 within a predetermined period of time, in which the type associated with the respective selection is a type of physical computational resources that is associated with a faster execution time of the respective task 2-tsk-11 relative to other execution times of the respective task in conjunction with the other types. For example, one type of processors may be associated with digital-signal-processors, such as 1-DSP, while another type of processors may be associated with general purpose processors such as 1-cmp-11a. The selection of 2-code-11c for executing 2-tsk-11 facilitates the allocation of the faster type (1-DSP) for fulfilling the respective constraint 11-c calling for successfully completing execution of the respective task 2-tsk-11 within a predetermined period of time. In one embodiment, the type of physical computational resources that is associated with the faster execution time is a type associated with at least one of: (i) a certain digital-signal-processor (DSP) such as 1-DSP, (ii) a certain field-programmable-gate-array (FPGA) such as 1-FPGA, (iii) a certain graphical-processing-unit (GPU) such as 1-GPU, and (iv) a certain dedicated application-specific-integrated-chip (ASIC) such as 1-ASIC, in which the respective code segment selected is optimized for execution in conjunction with said type.

In one embodiment, said constraint (e.g., 12-c), associated with the at least one of the selections (e.g., the selection of 2-code-12a for executing 2-tsk-12), is a requirement to successfully complete execution of the specific task 2-tsk-12 at a specific cost or lower, in which the type associated with the respective selection is a type of physical computational resources that is associated with a lower cost of executing the respective task 2-tsk-12 relative to other costs of executing the respective task in conjunction with the other types. For example, one type of processors may be associated with general purpose processors, such as 1-cmp-11a, while another type of processors may be associated with dedicated processors/hardware. The selection of 2-code-12a for executing 2-tsk-12 facilitates the allocation of the cheaper type (1-cmp-11a) for fulfilling the respective constraint 12-c calling for successfully completing execution of the respective task 2-tsk-11 at the specific cost or lower. In one embodiment, the type of physical computational resources that is associated with the lower cost of execution is a type associated with at least one of: (i) a certain general purpose central processing unit (CPU) such as 1-cmp-11a, (ii) a certain general purpose programmable controller such as 1-cmp-5, and (iii) a certain low-power processor such as 1-cmp-5, in which the respective code segment selected is optimized for execution in conjunction with said type.

In one embodiment, at least one of the constraints is a requirement to use a code segments associated with at least one of: (i) a certain type of code license, (ii) an open source origin, (iii) a closed source origin, (iv) a specific author, publisher, or provider, (v) a certain publish date or a range of dates, and (vi) a certain update date or a range of dates; and the respective code segment selected is a code segment complying with said requirement.

In one embodiment, at least one of the constraints is a requirement to successfully complete execution of the specific task at a specific cost or lower; and the respective code segment selected is a code segment associated with a cost determined by a provider thereof, in which the cost determined is lower than the specific cost. In one embodiment, the cost determined was resolved via bidding.

In one embodiment, at least one of the constraints is a requirement to successfully complete execution of the specific task at a specific cost or lower; and the respective code segment selected is associated with one of the sub-sets of physical computational resources that is related to a cost determined by a hardware provider of the sub-set, in which the cost determined is lower than the specific cost. In one embodiment, the cost determined was resolved via bidding.

Figure 7:
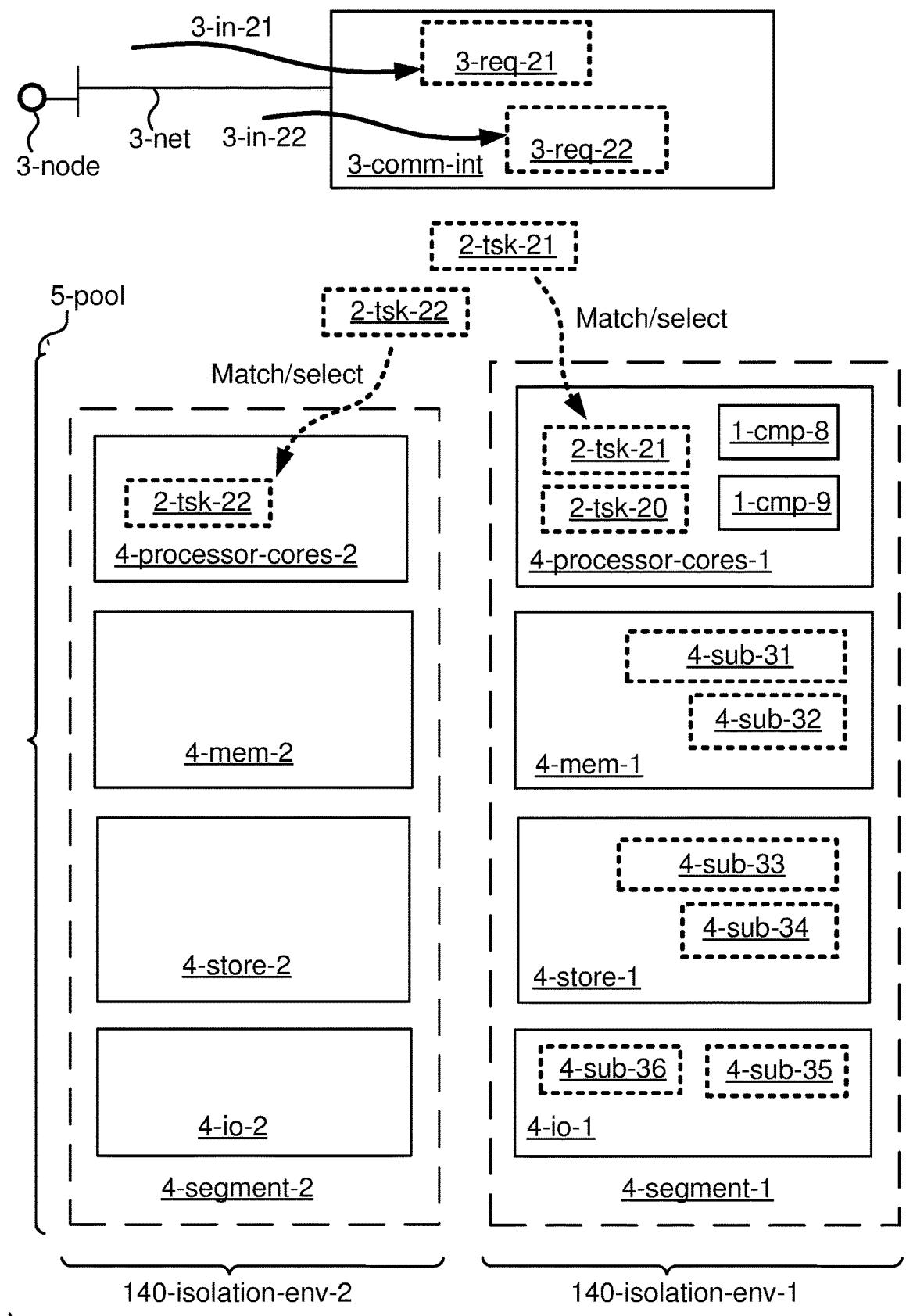
FIG. 7 illustrates one embodiment of a system operative to match each of a plurality of tasks with one of at least two different types of isolation environments operative to execute the tasks.

FIG. 7 illustrates one embodiment of a system 140-sys operative to match each of a plurality of tasks with one of at least two different types of isolation environments operative to execute the tasks. The system 140-sys receives requests, such as requests 3-req-21 and 3-req-22, to perform specific tasks, such as tasks 2-tsk-21 and 2-tsk-22 respectively. Several tasks may be associated with a single request, or a single request may be associated with a single task. The requests may be received 3-in-21, 3-in-22 in the system 140-sys via a communication interface 3-comm-int such as a network adaptor or an input-output port, or the requests may be generated internally in the system 140-sys. The requests may be conveyed to the system 140-sys via a network 3-net such as the Internet, in which the network may communicatively connect a requesting entity 3-node, such as a client device, with the system 140-sys. The system 140-sys may be a server, a device, a data center, a cloud base environment, or a combination thereof. Some of the tasks (e.g., 2-tsk-20) may be executed in the system 140-sys without being explicitly requested for. The tasks may be requested using a standard request mechanism such as a remote-procedure-call (RPC) protocol, or they may be requested in other ways. The tasks requested may be associated with microservices, or mathematical algorithms to perform, or they may be any function or service needed by a requesting entity 3-node.

In one embodiment, the system 140-sys is required to execute each of the tasks 2-tsk-21, 2-tsk-22 in isolation from the other tasks, therefore preventing one of the tasks from interfering or otherwise affecting execution of another task, either accidently or maliciously. There are several possible mechanism for achieving isolation between tasks. Examples for possible isolation mechanism, also referred to as isolation environments, may include: (i) a mechanism operative to facilitate on-demand isolated execution of the task, such as system 100-sys associated with FIG. 1 and in accordance with some embodiments, (ii) a dedicated in-operating-system mechanism, such as a container, (iii) a dedicated operating-system, such as a virtual machine (VM), and (iv) a dedicated compute element such as a processor core or a central-processing-unit (CPU), which is dedicated for execution of the task. Each of the isolation mechanisms/environments has advantages and disadvantages over the other mechanism. For example, using a virtual machine per task may be safer than utilizing a container, but it may also require more resources. In another example, using on-demand isolated execution of tasks may be faster and more resource-efficient relative to a container-based approach, but the on-demand isolated execution may be limited by the size and complexity of code and data associated with the task at hand.

In one embodiment, the system 140-sys employs several different types of isolation environments, such as a first-type isolation environment 140-isolation-env-1 and a second-type isolation environment 140-isolation-env-2. Each of the types of isolations environments is associated with a unique set of computational resources, taken out of a pool 5-pool of computational resources available in the system 140-sys. For example, the first-type isolation environment 140-isolation-env-1 is uniquely associated with a first segment 4-segment-1 of the computational resources, and the second-type isolation environment 140-isolation-env-2 is uniquely associated with a second segment 4-segment-2 of the computational resources. The first segment 4-segment-1 may include various computational resources needed by the first-type isolation environment 140-isolation-env-1 to execute one or several tasks in isolation, comprising: (i) a unique physical memory space 4-mem-1 such as a unique random-access-memory (RAM) space or a unique flash memory space, (ii) a unique physical storage space 4-store-1 such as unique magnetic hard disk space or a unique flash disk space, (iii) a unique set of input-output (TO) channels 4-io-1, and (iv) a unique set of compute elements 4-processor-cores-1 such as processor cores, central-processing-units (CPU), or other processing devices. Similarly, the second segment 4-segment-2 may include various other computational resources needed by the second-type isolation environment 140-isolation-env-2 to execute one or several tasks in isolation from each other and in isolation from the task/s handled by 140-isolation-env-1, comprising: (i) another unique physical memory space 4-mem-2 such as a unique random-access-memory (RAM) space or a unique flash memory space, (ii) another unique physical storage space 4-store-2 such as unique magnetic hard disk space or a unique flash disk space, (iii) another unique set of input-output (TO) channels 4-io-2, and (iv) another unique set of compute elements 4-processor-cores-2 such as processor cores, central-processing-units (CPU), or other processing devices.

In one embodiment, the system 140-sys matches each of the tasks 2-tsk-21, 2-tsk-22 with one of at least two different types of isolation environments 140-isolation-env-1, 140-isolation-env-2 available in the system. For example, after receiving 3-in-21 a request 3-req-21 to execute task 2-tsk-21, the system 140-sys has to decide which type of isolation environment to use for such execution. In this example, the first-type isolation environment 140-isolation-env-1 may be an on-demand isolation environment such as 100-sys in accordance with some embodiments, and the second-type isolation environment 140-isolation-env-2 may be a virtual machine (VM). The system may examine the requested task 2-tsk-21, and conclude that the task (e.g., a short mathematical calculation) is relatively simple, will be executed for completion quickly, will not require a lot of computational resources, and therefore the system 140-sys may decide to execute task 2-tsk-21 using the first-type isolation environment 140-isolation-env-1, which is an on-demand isolation environment, and is therefore perfectly suited for executing a tasks such as 2-tsk-21. Since task 2-tsk-21 is relatively simple and short-lived, it would not make sense for the system 140-sys to try and execute 2-tsk-21 using the virtual machine 140-isolation-env-2, because dedicating an entire virtual machine (a dedicated operating system) for such a task would be a waste of resources and a waste of overhead time needed to set the VM for executing task 2-tsk-21. After deciding to execute task 2-tsk-21 using the on-demand isolation environment 140-isolation-env-1, the system 140-sys directs task 2-tsk-21 (i.e., an associated code segment and data sets are directed) into the on-demand isolation environment, for execution in conjunction with the segment of computational resources 4-segment-1 available to the on-demand isolation environment. Upon reception of the 2-tsk-21 (code segment comprising commands and data sets) in the on-demand isolation environment 140-isolation-env-1, the on-demand isolation environment executes the task in isolation by: converting the respective commands into executable instructions and running the executable instructions, in which the commands are converted so as to cause the respective executable instructions to access only computational resources belonging to a sub-set of resources (e.g., 1-cmp-8, 4-sub-31, 4-sub-33, 4-sub-35) allocated within the respective segment 4-segment-1, thereby preventing the respective executable instructions from altering or otherwise affecting the other computational resources of segment 4-segment-1, or the computational resources of segment 4-segment-2. The result is that task 2-tsk-21 gets executed by the on-demand isolation environment 140-isolation-env-1, and in isolation from other tasks, such as 2-tsk-20 that may also be executed in 140-isolation-env-1 but using completely separate sub-set of computational resources within segment 4-segment-1 (e.g., using 1-cmp-9, 4-sub-32, 4-sub-34, 4-sub-36). After receiving 3-in-22 another request 3-req-22 to execute a different task 2-tsk-22, the system 140-sys has to decide again which type of isolation environment to use for such execution. The system may examine the requested task 2-tsk-22, and conclude that the task (e.g., a web crawler) is relatively complex, will be executed over an extended period of time, will require a lot of computational resources, and therefore the system 140-sys my decide to execute task 2-tsk-22 using the second-type isolation environment 140-isolation-env-2, which is a VM, and is therefore capable of handling task 2-tsk-22. Since task 2-tsk-22 is complex and long-lived, it would not make sense for the system 140-sys to try and execute 2-tsk-22 using the on-demand environment 140-isolation-env-1. After deciding to execute task 2-tsk-22 using a VM, the system 140-sys may initiate a new VM by allocating an entire segment of computational resources 4-segment-2 to the new VM 140-isolation-env-2, or it may re-use a vacant VM already in possession of segment 4-segment-2. The system 140-sys then directs task 2-tsk-22 (i.e., an associated code segment and data sets are directed) into the designated VM 140-isolation-env-2, which starts execution of 2-tsk-22 in isolation from other tasks 2-tsk-21, 2-tsk-20 that are being executed in 140-isolation-env-1.

In one embodiment, the system 140-sys is required to handle thousands of tasks simultaneously, in which the tasks are of various types, complexity levels, and durations. System 140-sys is depicted as having only two segments 4-segment-1, 4-segment-2 associated respectively with two isolation environments 140-isolation-env-1, 140-isolation-env-2, but system 140-sys may have dozens of different segments of computational resources, arranged in many different configuration. For example, at any given time, the system 140-sys may partition the pool of resources 5-pool into several segments such as segment 4-segment-1, in which each of these segments is associated with a separate on-demand isolation environment such as 140-isolation-env-1. Each of the instances of the on-demand isolation environments has its own segment of computational resources, and is therefore able to execute, per such instance, thousands of tasks in isolation at the same time. So, given several such instances, the system 140-sys may handle tens of thousands of simple tasks simultaneously and in isolation. In addition, the system may further partition the pool of resources 5-pool into tens, or perhaps hundreds of segments associated with a respective number of container instances, in which each of the container is able to execute in isolation a task that is usually more complex than on-demand executed tasks. Additional partitions of pool S-pool may include several segments associated with a respective number of virtual machines, enabling each of the virtual machines to execute in isolation a single complex task. Other partitions may include dedicated compute elements and other resources per each of the tasks. In some cases, it would be statistically correct to assume that most of the tasks are simple, many of the tasks are more complex, and that some of the tasks are very complex, in which all of these types of tasks are to be executed in isolation from each other. Accordingly, system 140-sys has to partition resources, in the form of segments, between several types of isolation environments, and in varying numbers of instances of segments per each the types. In one embodiment, the system receives a massive number of requests to perform a very big number of tasks, and then tries to come up with a good match between the tasks and the execution environments, thereby optimizing usage of the computational resources and overhead setup time.

One embodiment is a system 140-sys operative to select a particular type of isolation environment for executing a specific task. The system includes a pool 5-ppol of computational resources partitioned into at least two segments 4-segment-1, 4-segment-2 of computational resources, in which each of the segments is associated with a respective particular type of isolation environment operative to execute at least one task (e.g., 2-tsk-21) in a respective particular way and in isolation from other tasks (e.g., 2-tsk-20, 2-tsk-22) currently executed or to be executed in the system. For example, segment 4-segment-1 is associated with a first type of isolation environment 140-isolation-env-1, and segment 4-segment-2 is associated with a second type of isolation environment 140-isolation-env-2. The system 140-sys further includes an interface 3-comm-int operative to receive 3-in-21, 3-in-22 requests 3-req-21, 3-req-22 to perform tasks 2-tsk-21, 2-tsk-22.

In one embodiment, the system 140-sys is configured to: receive 3-req-21, via the interface 3-comm-int, a request 3-req-21 to perform a specific task 2-tsk-21; select, using at least one criterion, one of the particular types of isolation environment (e.g., 140-isolation-env-1 is selected) to be used to execute, in the respective particular way and in isolation, the specific task requested 2-tsk-21; and allocate at least a sub-set (e.g., 1-cmp-8, 4-sub-31, 4-sub-33, 4-sub-35) of the segment of computational resources 4-segment-1 associated with the particular type selected 140-isolation-env-1, in which said at least sub-set allocated is to be utilized for executing the specific task 2-tsk-21 using the particular type of isolation environment selected 140-isolation-env-1.

In one embodiment, each of the particular types of isolation environments 140—(e.g., isolation-env-1) are further operative to execute tasks (e.g., 2-tsk-20, 2-tsk-22) in isolation from at least some management processes executed in the system 140-sys.

In one embodiment, each of the segments of computational resources (e.g., 4-segment-1) comprises at least one of: (i) a unique physical memory space 4-mem-1 such as a unique random-access-memory (RAM) space or a unique flash memory space, (ii) a unique physical storage space 4-store-1 such as unique magnetic hard disk space or a unique flash disk space, (iii) a unique set of input-output (TO) channels 4-io-1, and (iv) a unique set of compute elements 4-processor-cores-1 such as processor cores, central-processing-units (CPU), or other processing devices.

In one embodiment, each of the segments of computational resources 4-segment-1, 4-segment-2 is statically associated with the respective particular type of isolation environment 140-isolation-env-1, 140-isolation-env-2. In one embodiment, the computational resources in a segment 4-segment-1, 4-segment-2 may change dynamically over time, and the system 140-sys is further configured to transfer computational resources from one of the segments 4-segment-1 to another of the segments 4-segment-2.

In one embodiment, one of the particular types of isolation environments (e.g., 140-isolation-env-1) is a sub-system operative to facilitate on-demand isolated execution of the specific task 2-tsk-21, in which said on-demand isolated execution of the specific task is achieved in the sub-system by: executing, per the specific task requested, a set of commands associated with the specific task, by converting the commands into executable instructions and running the executable instructions, in which the commands are converted so as to cause the respective executable instructions to access only computational resources belonging to the sub-set allocated 1-cmp-8, 4-sub-31, 4-sub-33, 4-sub-35 within the respective segment 4-segment-1, thereby preventing the respective executable instructions from altering or otherwise affecting the other computational resources.

In one embodiment, another one of the particular types of isolation environments (e.g., 140-isolation-env-2) is a dedicated in-operating-system mechanism, such as a container, operative to contain in isolation the execution of the specific task 2-tsk-21 using only computational resources belonging to the respective segment 4-segment-2.

In one embodiment, said criterion is associated with at least one of: a complexity or a size of a code segment associated with the specific task 2-tsk-21, or an amount of computational resources required to execute the specific task; and said selection is a selection of the dedicated in-operating-system mechanism 140-isolation-env-2 as the particular type of isolation environment to be used to execute the specific task requested 2-tsk-21, in which the dedicated in-operating-system mechanism 140-isolation-env-2 is selected, instead of the sub-system 140-isolation-env-1, because the specific task 2-tsk-21 is associated with at least one of: a complexity or size of the code segment that are above a certain level, or an amount of computational resources required to execute the specific task which is above a certain threshold.

In one embodiment, said criterion is associated with at least one of: a complexity or a size of a code segment associated with the specific task 2-tsk-21, or an amount of computational resources required to execute the specific task; and said selection is a selection of the sub-system 140-isolation-env-1 as the particular type of isolation environment to be used to execute the specific task requested 2-tsk-21, in which the sub-system 140-isolation-env-1 is selected, instead of the dedicated in-operating-system mechanism 140-isolation-env-2, because the specific task is associated with at least one of: a complexity or size of the code segment that are below a certain level, or an amount of computational resources required to execute the specific task which is blow a certain threshold.

In one embodiment, another one of the particular types of isolation environments (e.g., 140-isolation-env-2) is a dedicated operating-system, such as a virtual machine (VM), operative to contain in isolation the execution of the specific task 2-tsk-21 using only computational resources belonging to respective segment 4-segment-2.

In one embodiment, said criterion is associated with a duration associated with executing the specific task 2-tsk-21; and said selection is a selection of the dedicated operating-system 140-isolation-env-2 as the particular type of isolation environment to be used to execute the specific task requested 2-tsk-21, in which the dedicated operating-system 140-isolation-env-2 is selected, instead of the sub-system 140-isolation-env-1, because said duration is longer than a certain period of time.

In one embodiment, said criterion is associated with a duration associated with executing the specific task 2-tsk-21; and said selection is a selection of the sub-system 140-isolation-env-1 as the particular type of isolation environment to be used to execute the specific task requested 2-tsk-21, in which the sub-system 140-isolation-env-1 is selected, instead of the dedicated operating-system 140-isolation-env-2, because said duration is shorter than a certain period of time.

In one embodiment, one of the particular types of isolation environments is a dedicated compute element 140-isolation-env-1 such as a processor core or a central-processing-unit (CPU), which is dedicated for execution of the specific task 2-tsk-21; and another one of the particular types of isolation environments 140-isolation-env-2 is a dedicated operating-system, such as a virtual machine (VM), operative to contain in isolation the execution of the specific task 2-tsk-21 using only resources belonging to the respective segment 4-segment-2.

In one embodiment, said criterion is associated with at least one of: a performance level, or a security level expected in conjunction with executing the specific task 2-tsk-21; and said selection is a selection of the dedicated compute element 140-isolation-env-1 as the particular type of isolation environment to be used to execute the specific task requested 2-tsk-21, in which the dedicated compute element 140-isolation-env-1 is selected, instead of the dedicated operating-system 140-isolation-env-2, because said performance level expected, or said security level expected is above a certain level.

In one embodiment, said criterion is associated with at least one of: a performance level, or a security level expected in conjunction with executing the specific task 2-tsk-21; and said selection is a selection of the dedicated operating-system 140-isolation-env-2 as the particular type of isolation environment to be used to execute the specific task requested 2-tsk-21, in which the dedicated operating-system 140-isolation-env-2 is selected, instead of the dedicated compute element 140-isolation-env-1, because said performance level expected, or said security level expected is below a certain level.

In one embodiment, the at least two particular types of isolation environments 140-isolation-env-1, 140-isolation-env-2 are associated respectively with at least two of: (i) a sub-system operative to facilitate on-demand isolated execution of the task, (ii) a dedicated in-operating-system mechanism, such as a container, (iii) a dedicated operating-system, such as a virtual machine (VM), and (iv) a dedicated compute element such as a processor core or a central-processing-unit (CPU), which is dedicated for execution of the task.

In one embodiment, said criterion is associated with at least one of: (i) a performance level, in which a better performing particular type of isolation environment is selected for a task requiring a performance level above a certain threshold, (ii) a security level expected in conjunction with executing the task, in which a more secure particular type of isolation environment is selected for a task requiring a security level above a certain threshold, (iii) a complexity or a size of a code segment associated with the task, in which the particular type of isolation environment selected is better to facilitate execution of a task associated with a code segment having a complexity or size above a certain threshold, (iv) an amount of computational resources required to execute the task, in which the particular type of isolation environment selected is operative to facilitate the amount of computational resources required, (v) a duration associated with executing the task, in which the particular type of isolation environment selected is better adapted to facilitating said duration, and (vi) a current availability of computational resources in each of the segments of computational resources, in which the particular type of isolation environment selected is associated with a segment from which the sub-set of computational resources is currently available for allocation.

Figure 8:
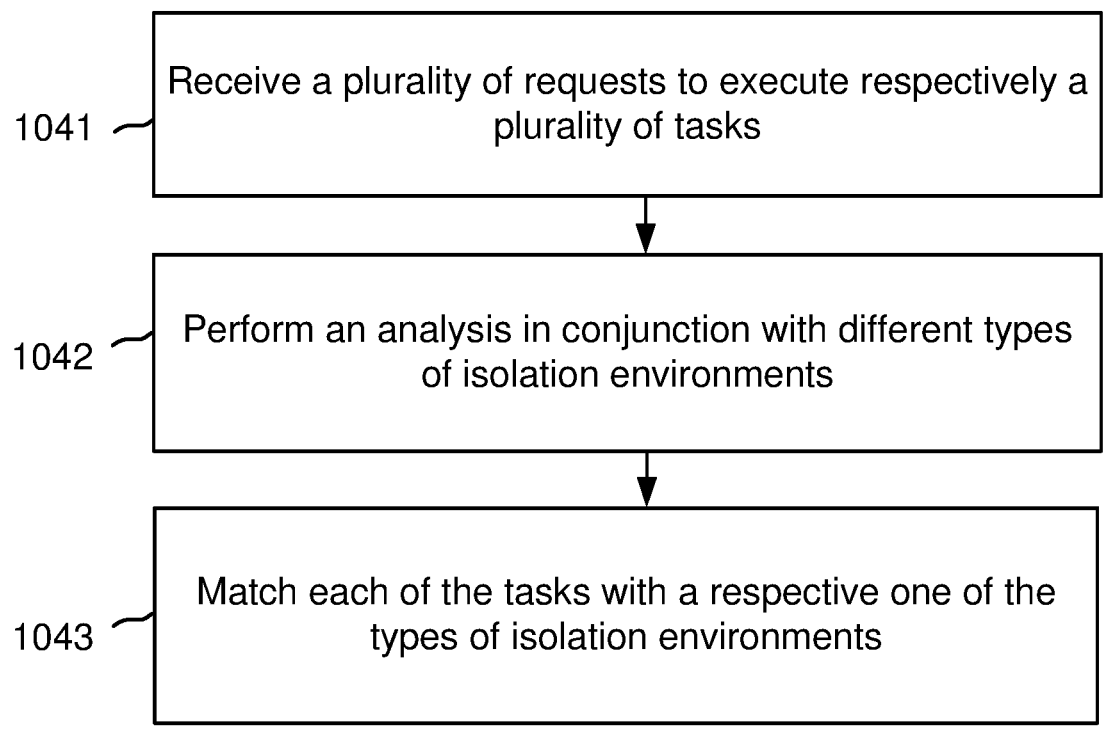
FIG. 8 illustrates one embodiment of a method for matching each of a plurality of tasks with one of at least two different types of isolation environments operative to execute the tasks.

FIG. 8 illustrates one embodiment of a method for dynamically matching each of a plurality of tasks with one of at least two different types of isolation environments operative to execute the tasks. The method includes: In step 1041, receiving 3-in-21, 3-in-22, in a computing platform 140-sys, a plurality of requests 3-req-21, 3-req-22 to execute respectively a plurality of tasks 2-tsk-21, 2-tsk-22, in which each of the plurality of tasks is to be executed, in isolation from the other tasks, using a particular one type of isolation environment to be selected for the task out of at least two different types of isolation environments 140-isolation-env-1, 140-isolation-env-2. In step 1042, analyzing, by the computing platform 140-sys, a current state of computational resources in each of a at least two segments 4-segment-1, 4-segment-2 of computational resources, in which the at least two segments of computational resources are associated respectively with the at least two different types of isolation environments 140-isolation-env-1, 140-isolation-env-2. In step 1043, based on said analysis, matching each of the plurality of tasks 2-tsk-21, 2-tsk-22 with a respective one of the at least two different types of isolation environments (e.g., 2-tsk-21 is matched with 140-isolation-env-1, and 2-tsk-22 is matched with 140-isolation-env-2), thereby spreading execution of the tasks 2-tsk-21, 2-tsk-22 between the at least two different types of isolation environments 140-isolation-env-1, 140-isolation-env-2.

In one embodiment, said matching is further based on a certain criterion, in which a particular type of isolation environment is selected for each of the tasks 2-tsk-21, 2-tsk-22 based on said criterion.

In one embodiment, the at least two different types of the isolation environments 140-isolation-env-1, 140-isolation-env-2 are associated respectively with at least two of: (i) a sub-system operative to facilitate on-demand isolated execution of the task, (ii) a dedicated in-operating-system mechanism, such as a container, (iii) a dedicated operating-system, such as a virtual machine (VM), and (iv) a dedicated compute element such as a processor core or a central-processing-unit (CPU), which is dedicated for execution of the task.

In one embodiment, said criterion is associated with at least one of: (i) a performance level, in which a better performing particular type of isolation environment is selected for a task requiring a performance level above a certain threshold, (ii) a security level expected in conjunction with executing the task, in which a more secure particular type of isolation environment is selected for a task requiring a security level above a certain threshold, (iii) a complexity or a size of a code segment associated with the task, in which the particular type of isolation environment selected is better to facilitate execution of a task associated with a code segment having a complexity or size above a certain threshold, (iv) an amount of computational resources required to execute the task, in which the particular type of isolation environment selected is operative to facilitate the amount of computational resources required, (v) a duration associated with executing the task, in which the particular type of isolation environment selected is better adapted to facilitating said duration, and (vi) a current availability of computational resources in each of the segments of computational resources, in which the particular type of isolation environment selected is associated with a segment from which the sub-set of computational resources is currently available for allocation.

In one embodiment, at least one of the requests 3-req-21, 3-req-22 is a remote-procedure-call (RPC).

In one embodiment, for each of the types of isolation environment (e.g., for 140-isolation-env-1), at least two of the tasks 2-tsk-21, 2-tsk-20 are matched therewith.

In one embodiment, the plurality of requests 3-req-21, 3-req-22 are received in the computing platform 140-sys as a stream of requests. In one embodiment, the computation resources comprise a plurality of compute elements 1-cmp-8, 1-cmp-9 such as processing cores; the stream of requests 3-req-21, 3-req-22 is received at an average rate of at least 1,000 (one thousand) requests per second per each of the compute elements participating is said execution of the tasks (e.g., for two participating cores 1-cmp-8, 1-cmp-9, the system receives at least 2,000 requests per second, but the requests are not necessarily spread symmetrically between the cores); said matching is done dynamically in real time, and; said execution of each of the tasks 2-tsk-21, 2-tsk-22, in the respective particular type of isolation environment matched therewith, is done so as to immediately follow the respective request. In one embodiment, at least some of the tasks 2-tsk-21, 2-tsk-22 are executed from beginning to completion within a period of 10 (ten) milliseconds.

Figure 9:
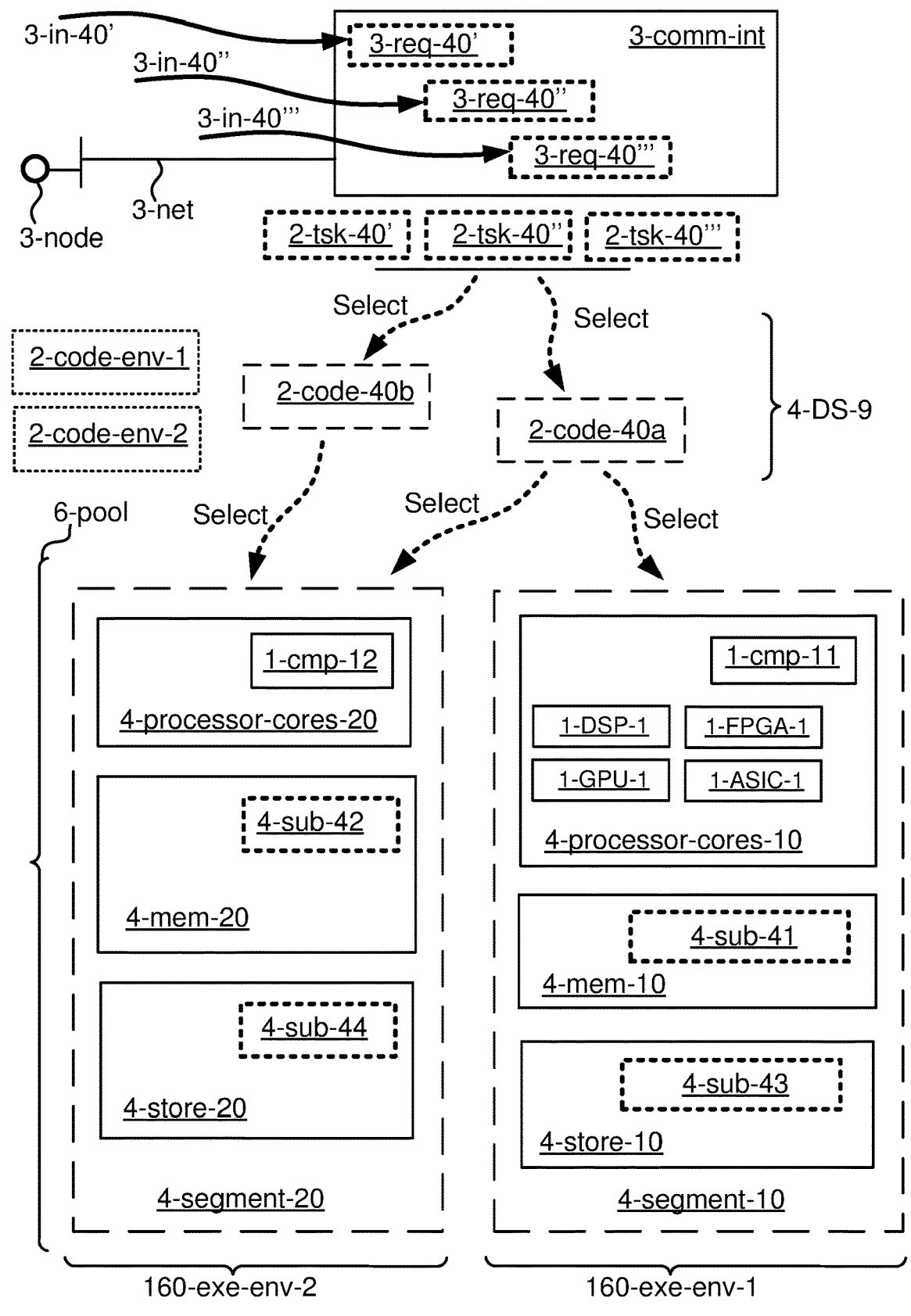
FIG. 9 illustrates one embodiment of a system operative to execute tasks adaptively.

FIG. 9 illustrates one embodiment of a system 160-sys operative to execute tasks adaptively. The system 160-sys may by a computing platform, a data center, a cloud based service, or even a device such as a server. An interface 3-comm-int in the system receives 3-in-40', 3-in-40", 3-in-40''' requests 3-req-40', 3-req-40", 3-req-40''', such as requests received using the remote-procedure-call (RPC) protocol, in which the requests are to perform certain tasks 2-tsk-40', 2-tsk-40", 2-tsk-40''' respectively. Each of the requests may be received in the system via a communication network 3-net from a different source, such as from 3-node, in which each of the requests may be for executing one of the tasks, or for executing several of the tasks. The tasks to be executed may be mathematical in nature, or they may be any kind a service needed by the requestor, such as a service associated with the Internet.

In one embodiment, system 160-sys may receive a large number of requests in a short period of time to execute the tasks, thereby requiring the system to execute at least most of the tasks efficiently. When one of the requests 3-req-40' is received 3-in-40' to execute the respective task 2-tsk-40', the system needs to decide how exactly to execute 2-tsk-40'. Executing task 2-tsk-40' may be achieved using a particular execution environment or another execution environment, using a certain isolation technique or a different isolation technique, using a specific code or a substitute code for running the task, and using a selection of different hardware components in doing so. The number of combinations, of both software components and hardware components, that are possible in facilitating execution of a specific task such as 2-tsk-40' is usually very large. For example, if task 2-tsk-40' is a mathematical task required to add a large sequence of numbers, then there are obviously many ways of achieving this task given a variety of means, and therefore some decisions needs to be made. A first decision regarding how to execute 2-tsk-40' may be a decision of which execution environment or isolation environment to use. Two different execution environments are shown 160-exe-env-1 and 160-exe-env-2, in which examples for execution environments, also including isolation environments, are: different operating systems, distinct virtual machines (VM), and various in-operating-system mechanisms such as containers. Selecting a certain execution environment for 2-tsk-40' may be done in many ways, but assuming a certain selection is done, such as selecting 160-exe-env-1, then 2-tsk-40' will be executed under the constraints of the selected environment 160-exe-env-1, meaning that 2-tsk-40' will be executed within the boundaries of a specific segment of hardware components 4-segment-10 available to 160-exe-env-1, in which under these boundaries, only: (i) specific processors 4-processor-cores-10 may be used, (ii) particular memory elements 4-mem-10 can be utilized, and (iii) certain storage elements 4-store-10 are available. Moreover, as 160-exe-env-1 was selected for executing 2-tsk-40', a related execution environment program 2-code-env-1 operative to run and govern the operation of 160-exe-env-1, is now also affecting the performance of task 2-tsk-40' being executed in 160-exe-env-1. A second decision regarding how to execute 2-tsk-40' may be a decision of which piece code to use for actually running task 2-tsk-40'. Since 2-tsk-40' may be relatively simple, such as the addition of a large sequence of numbers, then several implementations of such addition may be available in a form of several code segments 2-code-40a, 2-code-40b. A selection of code segment 2-code-40a for running 2-tsk-40' may have direct implications on efficiency, as the code segment itself affects the mathematical addition process, but also because the code segment selected 2-code-40a dictates using a certain sub-set of the computational resources available to 160-exe-env-1 in 4-segment-10, for example, the specific usage of processor 1-cmp-11. A third decision may be needed for using or not using hardware accelerators such as a graphical-processing-unit (GPU) 1-GPU-1 available in 4-segment-10. Other decisions may be needed as well, in which at the end of the decision process, which could take less than a millisecond, a specific combination of code components and hardware components is selected for executing 2-tsk-40'. Now, it may very well be that the decision process for executing 2-tsk-40' was done intelligently, while considering many factors, but still, because of the complex nature of elements involved, both hardware and software, and certainly when considering the strong interaction between hardware and software, it is virtually impossible to accurately predict which combination of elements will result in good performance when executing 2-tsk-40'.

In one embodiment, after system 160-sys has decided to use a certain combination of resources and software for executing task 2-tsk-40' (e.g., using the execution environment 160-exe-env-1, 2-code-evn-1 and the related segment of computational resources 4-segment-10, and running code segment 2-code-40a on processor 1-cmp-11), the system will now start executing task 2-tsk-40' using these resources and software described. While executing 2-tsk-40', and after finishing executing 2-tsk-40', the system 160-sys observes, gathers, and logs various parameters associated with the execution of 2-tsk-40'. Such parameters may be related to a duration of various phases of the execution, resource utilization during execution, power dissipation contributed by the execution, cost associated with the execution, and other parameters. After analyzing the parameters gathered, the system 160-sys may reach conclusions regarding how effective was the specific combination of resources and software in executing of 2-tsk-40'. Now, when another one of the requests 3-req-40" is received 3-in-40" to execute another task 2-tsk-40" that is at least similar, if not identical, to the already executed task 2-tsk-40', the system needs to decide again how exactly to execute 2-tsk-40". The system may be completely satisfied with the execution of 2-tsk-40', and decide to use the exact same resources and software for the execution 2-tsk-40", but this would not be very clever, at least because there are many more combinations of resources and software to try. So, the system 160-sys may decide to perhaps use the same code segment as before 2-code-40a, but this time using a different execution environment 160-exe-env-2, perhaps a different virtual machine (VM). The different execution environment 160-exe-env-2 is also associated with a respective different execution environment program 2-code-env-2, and a different segment of computational resources 4-segment-20, including a different processor 1-cmp-12 on which the same code segment 2-code-40a can run. The system now executes the new task 2-tsk-40" using the same code segment 2-code-40a as for 2-tsk-40', but now executed in conjunction with a different combinations or resources and software 160-exe-env-2, 2-code-env-2, 1-cmp-12. While executing 2-tsk-40", and after finishing executing 2-tsk-40", the system 160-sys again observes, gathers, and logs various parameters associated with the execution of 2-tsk-40". After analyzing the parameters gathered, the system 160-sys may now compare these parameters with those of the previous execution of 2-tsk-40', thereby reaching new conclusions regarding how effective was the original specific combination of resources and software in executing of 2-tsk-40' compared to how effective is the new combination of resources and software in executing of 2-tsk-40". The new conclusion may be that the new combination of resources and software 160-exe-env-2, 2-code-env-2, 1-cmp-12 is better than the original one 160-exe-env-1, 2-code-env-1, 1-cmp-11. When yet another one of the requests 3-req-40'" is received 3-in-40'" to execute yet another task 2-tsk-40'" that is at least similar, if not identical, to the already executed tasks 2-tsk-40', 2-tsk-40", the system 160-sys needs to decide yet again how exactly to execute 2-tsk-40'". In the name of trying new possibilities and combinations of elements to execute tasks of the sort of 2-tsk-40', 2-tsk-40", 2-tsk-40'", the system may attempt yet another combination for the execution of task 2-tsk-40'", and this time try using the same successful combination of execution environment and computational resources as was used with 2-tsk-40" (i.e., 160-exe-env-2, 2-code-env-2, 1-cmp-12, 2-code-40a), but this time using a different code segment 2-code-40b as the actual code implementation of 2-tsk-40'". The system 160-sys tries the new combination 160-exe-env-2, 2-code-env-2, 1-cmp-12, 2-code-40b for executing 2-tsk-40'", but this time the result may be less successful than the result of using the previous combination for executing 2-tsk-40", and therefore the system 160-sys concludes that the combination 160-exe-env-2, 2-code-env-2, 1-cmp-12, 2-code-40a is the most successful as of yet. For next requests to perform similar tasks, the system may use the combination 160-exe-env-2, 2-code-env-2, 1-cmp-12, 2-code-40a, or it may decide to attempt another combination, in which with every new attempt the system learns and fine-tunes the right combination for best results.

In one embodiment, the requests 3-req-40', 3-req-40", 3-req-40'" to execute tasks 2-tsk-40', 2-tsk-40", 2-tsk-40'" are only a very small fraction of a stream of thousands or even millions of requests calling for the execution of thousands of different tasks including many different types of tasks. It is clear that for the exact same and identical tasks, requested many times over and over perhaps by many different users, the conclusions regarding optimal execution configuration may be accurate and deterministic. However, good conclusions regarding optimal execution configurations can be formed even if the comparison between execution environments is made not in conjunction with executing identical tasks, but also in conjunction with executing tasks that are not identical, but do share features, components, or have some kind of commonality. For example, task 2-tsk-40' may require to add a large sequence of scalar numbers, task 2-tsk-40" may require to add and count a large sequence of numbers, and task 2-tsk-40''' may require to add a sequence of vector numbers. Although not exactly identical, the tasks 2-tsk-40', 2-tsk-40", 2-tsk-40''' have a clear resemblance, and there is a good chance that a first configuration optimal for executing one of the tasks, will also be optimal or at least good for executing the rest of the tasks. In another example, tasks 2-tsk-40', 2-tsk-40", 2-tsk-40''' may be doing completely different things, but they may all be associated perhaps with performing storage intensive transactions, or they may all be associated with intensive file transfer over the Internet; in this case, despite the functional difference between the tasks, it may still make sense to reach common conclusions regarding optimal execution configurations. Other commonalities between tasks may include the type of programming language used, the type of compiler or interpreter used, expected duration of execution, memory size required, nature of the task at hand, and others.

In one embodiment, the system 160-sys handles thousands of tasks, and groups the tasks into many categories. Any single task, together with its execution log, may belong to more than a single task category. For example, the execution-configuration performance log of a task for adding a sequence of numbers may belong to both a "simple math" category and to a "repetitive steps" category. When the system 160-sys needs to select an execution configuration for performing a new task, the system examines the new task, or a descriptive meta data or a contract thereof describing the functionality of the task, and tries to figure out which of the task categories is the closest one to the new task. When the system 160-sys selects the closest task category to the new task, it then reuses the best execution configuration recorded in that category, or a variation of that configuration, for executing the new task. The system manages execution configuration details per each of the categories, and also updates such details per each of the category as new execution data is available with new tasks being executed all the time. New execution data available, as a new task is executed, may be used to update more than one category of tasks, as the new task may have relevance to several task categories.

In one embodiment, machine learning techniques are used by system 160-sys to decide which of the task categories best describes a new task.

In one embodiment, machine learning techniques are used by system 160-sys to extrapolate a specific execution configuration for a new task based on at least some of all previous execution data and execution configurations of other tasks, in which said extrapolation takes into account resemblance to the new task of each of the tasks for which execution data and execution configuration was factored in.

Figure 10:
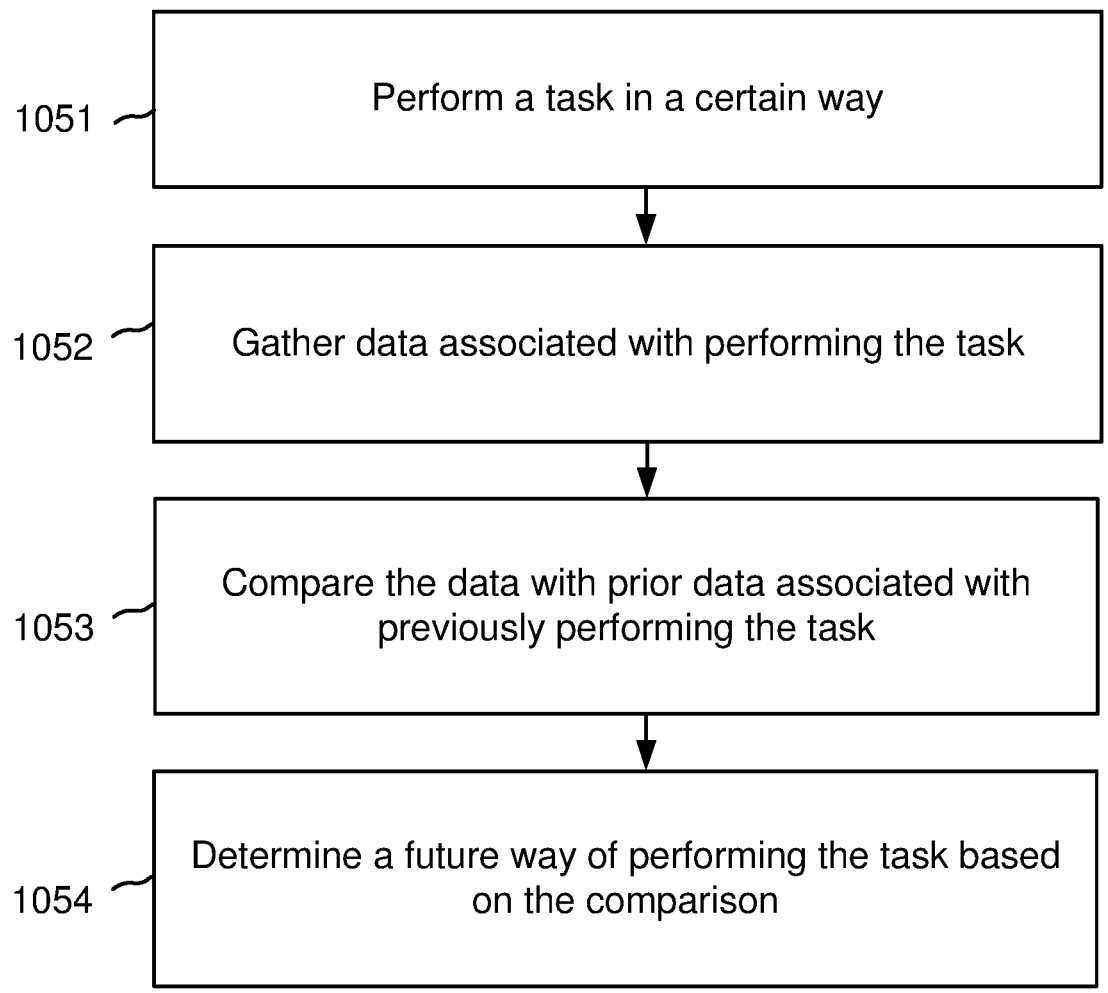
FIG. 10 illustrates one embodiment of a method for executing tasks adaptively.

FIG. 10 illustrates one embodiment of a method for executing tasks adaptively. The method includes: in step 1051, performing, in a computing platform 160-sys, a first task 2-task-40" in a certain way, in which said certain way of performing the first task is associated with a particular execution environment 160-exe-env-1 executing a specific code segment 2-code-40*a* associated with the first task 2-tsk-40". In step 1052, gathering data associated with said performing of the first task 2-task-40". In step 1053, comparing said data gathered with prior data associated with previously performing the first task 2-tsk-40', in which said previously performing the first task was achieved in a different way involving at least a different execution environment 160-exe-env-2 or at least a different code segment 2-code-40*b*. In step 1054, based, at least in part on said comparison, determining a future way of performing the first task 2-tsk-40'''.

In one embodiment, the particular execution environment 160-exe-env-1 is a particular isolation environment operative to execute the first task 2-tsk-40" in isolation from other tasks currently executed or to be executed in the computing platform, in which the particular isolation environment is associated with at least one of: (i) a sub-system operative to facilitate on-demand isolated execution of the first task, (ii) a dedicated in-operating-system mechanism, such as a container, (iii) a dedicated operating-system, such as a virtual machine (VM), and (iv) a dedicated compute element such as a processor core or a central-processing-unit (CPU), which is dedicated for execution of the task. In one embodiment, the sub-system, which is operative to facilitate on-demand isolated execution of the task, is similar to system 100-sys associated with FIG. 1, and in accordance with some embodiments. The sub-system is an isolation environment in which the on-demand isolated execution of the task is achieved in the sub-system by: executing, per the specific task requested, a set of commands associated with the specific task, by converting the commands into executable instructions and running the executable instructions, in which the commands are converted so as to cause the respective executable instructions to access only computational resources belonging to the sub-set allocated within the respective segment, thereby preventing the respective executable instructions from altering or otherwise affecting the other computational resources. In one embodiment, the different execution environment 160-exe-env-2 is a different isolation environment, in which the different isolation environment is dissimilar to the particular isolation environment 160-exe-env-1.

In one embodiment, the computing platform 160-sys comprises a pool 6-pool of computational resources partitioned into at least two segments of computational resources 4-segment-10, 4-segment-20; the particular execution environment 160-exe-env-1 is associated with a first one of the segments of computational resources 4-segment-10; the different execution environment 160-exe-env-2 is associated with a second one of the segments of computational resources 4-segment-20; and the method further comprises: switching from using the second segment of computational resources 4-segment-20 to using the first segment of computational resources 4-segment-10 in conjunction with a transition from previously using the different execution environment 160-exe-env-2 for performing the first task 2-tsk-40' to currently using the particular execution environment 160-exe-env-1 for performing the first task 2-tsk-40".

In one embodiment, the computing platform 160-sys comprises a pool 6-pool of computational resources comprising at least two sub-sets of computational resources (e.g., a first sub-set 1-cmp-11, 4-sub-41, 4-sub-43, and a second sub-set 1-cmp-12, 4-sub-42, 4-sub-44); the specific code segment 2-code-40*a* is associated with a first one of the sub-sets of computational resources 1-cmp-11, 4-sub-41, 4-sub-43; the different code segment 2-code-40*b* is associated with a second one of the sub-sets of computational resources 1-cmp-12, 4-sub-42, 4-sub-44; and the method further comprises: switching from using the second sub-set of computational resources 1-cmp-12, 4-sub-42, 4-sub-44 to using the first sub-set of computational resources 1-cmp-11, 4-sub-41, 4-sub-43 in conjunction with a transition from previously using the different code 2-code-40*b* segment for performing the first task 2-tsk-40' to currently using the specific code segment 2-code-40*a* for performing the first task 2-tsk-40".

In one embodiment, the data associated with the performing of the first task 2-tsk-40" in said certain way indicates a first performance level; and the prior data associated with the previous performing of the first task 2-tsk-40' in said different way indicates a second performance level. In one embodiment, the first performance level is better than the second performance level, thereby the future way of performing the first task 2-tsk-40''' is determined to be associated with the certain way of performing the first task 2-tsk-40". In one embodiment, the future way of performing the first task 2-tsk-40''' is associated with the particular execution environment 160-exe-env-1. In one embodiment, the future way of performing the first task 2-tsk-40''' is associated with executing the specific code segment 2-code-40*a*.

In one embodiment, the second performance level is better than the first performance level, thereby the future way of performing the first task 2-tsk-40''' is determined to be associated with the different way of performing the first task 2-tsk-40'. In one embodiment, the future way of performing the first task 2-tsk-40''' is associated with the different execution environment 160-exe-env-2. In one embodiment, the future way of performing the first task 160-exe-env-2 is associated with executing the different code segment 2-code-40*b*.

In one embodiment, the first performance level and the second performance level are both below a certain acceptable performance level, thereby the future way of performing the first task 2-tsk-40''' is determined to be associated with yet another way of performing the first task, in which said another way of performing the first task is dissimilar to both the certain way of performing the first task 2-tsk-40" and the different way of performing the first task 2-tsk-40'. In one embodiment, the another way of performing the first task is associated with a different code-segment/execution-environment combination in comparison to both: (i) the particular execution environment/specific code segment combination (160-exe-env-1/2-code-40*a*) associated with the certain way of performing the first task 2-tsk-2", and (ii) the different execution environment/different code segment combination (160-exe-env-2/2-code-40*b*) associated with the different way of performing the first task 2-tsk-2'.

In one embodiment, the first performance level is associated with a first period of time needed to perform the first task 2-tsk-40" from beginning to completion in conjunction with the certain way of performing the first task; and the second performance level is associated with a second period of time needed to perform the first task 2-tsk-40' from beginning to completion in conjunction with the different way of performing the first task; in which a shorter period of time needed to perform the first task from beginning to completion indicates a better performance level than a longer period of time needed to perform the first task from beginning to completion.

In one embodiment, the first performance level is associated with a first cost associated with performing the first task 2-tsk-40" from beginning to completion in conjunction with the certain way of performing the first task; and the second performance level is associated with a second cost associated with performing the first task 2-tsk-40' from beginning to completion in conjunction with the different way of performing the first task; in which a lower cost associated with performing the first task from beginning to completion indicates a better performance level than a higher cost associated with performing the first task from beginning to completion.

One embodiment is a system 160-sys operative to execute tasks adaptively. The system include: a pool 6-pool of computational resources comprising a plurality of hardware components; a data store 3-DS-9 operative to store a plurality of code components 2-code-40*a*, 2-code-40*b*, 2-code-env-1, 2-code-env-2; and an interface 3-comm-int operative to receive 3-in-40', 3-in-40", 3-in-40''' a plurality of requests 3-req-40', 3-req-40", 3-req-40''' to execute respectively a plurality of tasks 2-task-40', 2-task-40", 2-task-40''', in which each of the tasks is to be performed by the system 160-sys using a designated combination of: (i) code components selected from the data store 4-DS-9 specifically for performing the task, and (ii) hardware components selected from the pool of computational resources 6-pool specifically for performing the task.

In one embodiment, the system 160-sys is configured, per each of the tasks 2-task-40', 2-task-40", 2-task-40''', to: select the respective designated combination of code components and hardware components; perform the task using the respective designated combination of code components and hardware components; and per each of at least some of the tasks, determine and log a performance level in conjunction with said performing of the task, in which said performance level is a direct indication of the specific suitability of the designated combination of code components and hardware components, as a whole, to executed the task; in which said selection of the respective designated combination of code components and hardware components, per each of the tasks (e.g., per task 2-tsk-40'''), is done based on prior performance levels already determined and logged in the system for those of the tasks previously performed (e.g., based on performance level recorded and logged for 2-tsk-40', 2-tsk-40").

In one embodiment, the pool of computational resources 6-pool is partitioned into at least two segments of computational resources 4-segment-10, 4-segment-20, in which: (i) each of the segments comprises a different combination of the hardware components, and (ii) each of the segments is associated with a respective particular type of isolation environment operative to execute the task in a respective particular way and in isolation from other tasks currently executed or to be executed in the system (e.g., 4-segment-10 is associated with 160-exe-env-1, and 4-segment-20 is associated with 160-exe-env-2); and per each of the tasks (e.g., 2-task-40"), and in conjunction with the respective designated combination of code components and hardware components, the hardware components selected are related to one of the segments (e.g., related to 4-segment-10) associated with the respective particular type of isolation environment (in this example, 160-exe-env-1), in which said selection of the hardware components constitutes a selection of the respective particular type of isolation environment (in this example, 160-exe-env-1) for executing the task; in which, per each of the tasks, the respective performance level is directly affected by the selection of the respective particular type of isolation environment for executing the task.

In one embodiment, the plurality of code components comprises a plurality of code segments 2-code-40*a*, 2-code-40*b*; per each of at least some of the tasks (e.g., for 2-tsk-40"), there exists at least two different code segments in the data store 2-code-40*a*, 2-code-40*b*, in which each of the code segments 2-code-40*a*, 2-code-40*b* is operative to facilitate execution of the respective task (in this example, 2-tsk-40"); and per each of the at least some of the tasks (e.g., for 2-tsk-40"), and in conjunction with the respective designated combination of code components and hardware components, the selection of the code components is a selection of one of said code segments (e.g., 2-code-40*a*) out of said at least two code segments 2-code-40*a*, 2-code-40*b*; in which per each of the at least some of the tasks: the respective performance level is directly affected by the selection of the respective code segment (e.g., 2-code-40*a*); and the respective performance level is further affected by the execution of the respective code segment (e.g., 2-code-40*a*) by the respective particular type of isolation environment (e.g., 160-exe-env-1).

In one embodiment, the plurality of code components in the data store 4-DS-9 comprises a plurality of execution environment programs 2-code-env-1, 2-code-env-2; each of the execution environment programs in the data store is associated with a different execution environment such as an operating system, a container, or a virtual machine (e.g., 2-code-env-1 is associated with 160-exe-env-1, and 2-code-env-2 is associated with 160-exe-env-2), in which each of said execution environment programs comprises a set of specific commands needed to execute the respective execution environment; and per each of the tasks (e.g., 2-task-40"), and in conjunction with the respective designated combination of code components and hardware components, the selection of the code components is a selection of the respective execution environment program (e.g., 2-code-env-1 is selected for 2-tsk-40"), in which said selection of the execution environment program (in this example, 2-code-env-1) constitutes a selection of the respective execution environment (in this example, 160-exe-env-1) for executing the task; in which, per each of the tasks, the respective performance level is directly affected by the selection of the respective execution environment for executing the task. In one embodiment, the pool of computational resources 6-pool is partitioned into a plurality of combinations of hardware components (e.g., a first combination 1-cmp-11, 4-sub-41, and a second combination 1-GPU-1, 4-sub-41, both associated with 160-exe-env-1), in which each of the combinations of hardware components is operative to facilitate at least one of the execution environment, so as to make available different combinations of hardware components for facilitating each of the execution environments; and per each of the at least some of the tasks (e.g., 2-tsk-40"), and in conjunction with the respective designated combination of code components and hardware components, the selection of the hardware components is a selection of one of said combinations of hardware components operative to facilitate the execution environment selected for the task (e.g., the combination 1-GPU-1, 4-sub-41 is selected for executing 2-tsk-40" in selected environment 2-code-env-1); in which per each of the at least some of the tasks: the respective performance level is directly affected by the selection of the respective combination of hardware components; and the respective performance level is further affected by a way in which the execution environment selected for the task performs in conjunction with the combination of hardware components selected.

In one embodiment, said selection of the respective designated combination of code components and hardware components, per each of the tasks, is done based on a statistical analysis performed on a large number of said prior performance levels already determined, in which said large number is higher than 1,000, thereby allowing the system 160-sys to approach an optimal selection of a combination of code components and hardware component for performing the task. In one embodiment, a changing condition in the system 160-sys affects, over time, said performance levels, and therefore the system constantly adapts, over time, said combination of code components and hardware component selected for the task.

In one embodiment, said selection of the respective designated combination of code components and hardware components, per each of the tasks (e.g., for 2-tsk-40"), is done based on prior performance levels already determined and logged in the system for those of the tasks (e.g., for 2-tsk-40') previously performed and that are directly related to the task for which the selection is currently being made. In one embodiment, the directly related tasks previously performed (e.g., 2-tsk-40') are identical to the task for which the selection is currently being made (e.g., 2-tsk-40"). In one embodiment, the directly related tasks previously performed (e.g., 2-tsk-40') are not exactly identical to the task for which the selection is currently being made (e.g., 2-tsk-40"), however there exists at least one common feature or element among the tasks 2-tsk-40', 2-tsk-40" which allows the selection to be based on said prior performance levels.

In one embodiment, the plurality of hardware components are associated with at least one of: (i) different types of physical memory components such as a random-access-memory (RAM) components or flash memory components 4-mem-10, 4-mem-20, (ii) different types of physical storage components such as magnetic hard disk components or a flash disk components 4-store-10, 4-store-20, and (iii) different types of processing components 4-processor-cores-10, 4-processor-cores-20 such as general-purpose-processors (CPU) 1-cmp-11, 1-cmp-12, digital-signal-processors (DSP) 1-DSP-1, field-programmable-gate-arrays (FPGA) 1-FPGA-1, graphical-processing-units (GPU) 1-GPU-1, and dedicated application-specific-integrated-chips (ASIC) 1-ASIC-1.

In one embodiment, per each of the tasks (e.g., 2-tsk-40"), said selection of the respective designated combination of code components and hardware components occurs no later than 10 (ten) milliseconds after receiving 3-in-40" the respective request 3-req-40".

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for selecting a particular code segment for executing a specific task while complying with a certain execution constraint, comprising:
   receiving a request to execute a specific task, in which said execution is required to comply with at least one certain constraint;
   accessing a database comprising a plurality of code segments, in which at least two of the code segments in the database are operative to facilitate execution of the specific task requested, and in which each of the code segments requires a respective sub-set of physical computational resources to be successfully executed;
   determining, per each of the at least two code segments, and given a current state of physical computational resources availability, a system constraint arising in conjunction with allocating the respective sub-set of physical computational resources; and
   selecting, out of the at least two code segments, one particular code segment that allows compliance with the certain constraint in view of the respective system constraint.

2. The method of claim 1, wherein:
   said certain constraint is a requirement to successfully complete execution of the specific task within a predetermined period of time; and
   said system constraint is a required period of time determined to be needed for successful allocation of the respective sub-set of physical computational resources, in which said required period of time is shorter than the predetermined period of time, and thereby allowing said compliance with the certain constraint.

3. The method of claim 1, wherein:
   said certain constraint is a requirement to successfully complete execution of the specific task at a specific cost or lower; and
   said system constraint is a cost determined to be associated with successfully allocating the respective sub-set of physical computational resources, in which said cost determined is lower than the specific cost.

4. The method of claim 3, wherein said cost determined is a cost associated with operating the respective sub-set of physical computational resources associated with the particular code segment selected.

5. The method of claim 3, wherein said cost determined is an outcome of a bid placed and won by a hardware provider of the respective sub-set of physical computational resources associated with the particular code segment selected.

6. The method of claim 1, wherein:
   said certain constraint is a requirement to successfully complete execution of the specific task at a specific cost or lower; and
   said system constraint is a feasibility of successfully allocating the respective sub-set of physical computational resources, in which the particular code segment selected is a code segment that is both: (i) associated with a respective cost that is lower than the specific cost, and (ii) associated with the respective sub-set of physical computational resources having a feasibility of being successfully allocated given the current state of physical computational resources availability.

7. The method of claim 6, wherein said respective cost is determined by a provider of the particular code segment selected.

8. The method of claim 7, wherein said determination of the respective cost is resolved via bidding, in which the provider of the particular code segment selected has placed a bid that is lower than other bids from other providers associated with other code segments operative to facilitate execution of the specific task requested.

9. The method of claim 1, wherein:
   said certain constraint is a requirement to use a code segments associated with at least one of: (i) a certain type of code license, (ii) an open source origin, (iii) a closed source origin, (iv) a specific author, publisher, or provider, (v) a certain publish date or a range of dates, and (vi) a certain update date or a range of dates; and
   said system constraint is a feasibility of successfully allocating the respective sub-set of physical computational resources, in which the particular code segment selected is a code segment that is both: (i) complying with said requirement, and (ii) associated with the respective sub-set of physical computational resources having a feasibility of being successfully allocated given the current state of physical computational resources availability.

10. A system operative to select a particular code segment for executing a specific task while complying with a certain execution constraint, comprising:
a pool of physical computational resources comprising at least a first sub-set and a second sub-set of physical computational resources, in which each of the sub-sets comprises at least a respective set of storage space, and a respective set of processors; and
a database comprising a plurality of code segments, in which at least two of the code segments in the database are operative to facilitate execution of a specific task, and in which each of the code segments requires a respective one of the sub-sets of physical computational resources to be successfully executed;
wherein:
the system is configured to:
receive a request to execute the specific task, in which said execution is required to comply with at least one certain constraint;
access the at least two code segments in the database;
determine, per each of the at least two code segments, and given a current state of physical computational resources availability in the pool, a system constraint arising in conjunction with allocating the respective sub-set of physical computational resources; and
select, out of the at least two code segments, one particular code segment that allows compliance with the certain constraint in view of the system constraint associated with said one particular code segment selected, thereby designate the respective one of the sub-sets of physical computational resources for executing the specific task.

11. The system of claim 10, wherein the system if further configured to:
allocate the sub-set of physical computational resources associated with the one particular code segment selected, in which said allocation is done in conjunction with the respective system constraint; and
execute the one particular code segment selected, using the sub-set of physical computational resources just allocated, thereby facilitating compliance with the certain constraint while operating within the respective system constraint.

12. A method for selecting a particular code segment for executing a specific task while complying with a certain constraint, comprising:
receiving a request to execute a specific task, in which said execution is required to comply with at least one certain constraint;
accessing a database comprising a plurality of code segments, in which at least two of the code segments in the database are operative to facilitate execution of the specific task requested, and in which each of the code segments requires a respective sub-set of physical computational resources to be successfully executed;
determining, per each of the at least two code segments, and given a current state of physical computational resources availability, a feasibility of successfully allocating the respective sub-set of physical computational resources; and
selecting, out of the at least two code segments, one particular code segment for which: (i) successful allocation of the respective sub-set of physical computational resources was determined to be feasible, and (ii) using the particular code segment, given successful allocation of the respective sub-set of physical computational resources, is operative to comply with the certain constraint.

13. The method of claim 12, wherein:
said certain constraint is a requirement to successfully complete execution of the specific task within a predetermined period of time; and
said feasibility is a feasibility of successfully allocating the respective sub-set of physical computational resources within a period of time that is shorter than the predetermined period of time.

14. The method of claim 12, wherein:
said certain constraint is a requirement to successfully complete execution of the specific task at a specific cost or lower; and
said feasibility is a feasibility of successfully allocating the respective sub-set of physical computational resources at a cost that is lower than the specific cost.

15. A system operative to select particular code segments for executing specific tasks, comprising:
a pool of physical computational resources comprising a plurality of sub-sets of physical computational resources, in which each of the sub-sets comprises at least a respective set of storage space, and a respective set of processors; and
a plurality of code segments, in which: (i) each of the code segments is operative to facilitate execution of a specific task, and (ii) for any given specific task there are at least two possible code segments able to facilitate execution thereof, in which each of the possible code segments requires a different one of the sub-sets to be successfully executed;
wherein:
the system is configured to receive a plurality of requests associated respectively with a plurality of constraints, in which each of the requests is a request to execute a specific one of the tasks while complying with the respective constraint; and
the system is further configured to dynamically assess current availability of physical computational resources, out of the pool of physical computational resources, and select, per each of the requests and the respective task, a specific one of the at least two code segments able to facilitate execution thereof, in which said plurality of selections, as a whole, are made to results in a respective plurality of sub-sets of physical computational resources that are together optimized to fit within said physical computational resources currently available, while each of the selections is also made to specifically result in the respective sub-set of physical computational resources that is operative to facilitate compliance with the respective constraint.

16. The system of claim 15, wherein:
said physical computational resources currently available comprise at least two types of physical computational resources; and
at least one of the selections is made to result in the respective sub-set of physical computational resources being of a specific one of the types that is operative to facilitate said compliance with the respective constraint.

17. The system of claim 16, wherein:
said constraint, associated with the at least one of the selections, is a requirement to successfully complete execution of the respective task within a predetermined period of time, in which the type associated with the respective selection is a type of physical computational resources that is associated with a faster execution time of the respective task relative to other execution times of the respective task in conjunction with the other types.

18. The system of claim 17, wherein the type of physical computational resources that is associated with the faster execution time is a type associated with at least one of: (i) a certain digital-signal-processor (DSP), (ii) a certain field-programmable-gate-array (FPGA), (iii) a certain graphical-processing-unit (GPU), and (iv) a certain dedicated application-specific-integrated-chip (ASIC), in which the respective code segment selected is optimized for execution in conjunction with said type.

19. The system of claim 16, wherein:
said constraint, associated with the at least one of the selections, is a requirement to successfully complete execution of the specific task at a specific cost or lower, in which the type associated with the respective selection is a type of physical computational resources that is associated with a lower cost of executing the respective task relative to other costs of executing the respective task in conjunction with the other types.

20. The system of claim 19, wherein the type of physical computational resources that is associated with the lower cost of execution is a type associated with at least one of: (i) a certain general purpose central processing unit (CPU), (ii) a certain general purpose programmable controller, and (iii) a certain low-power processor, in which the respective code segment selected is optimized for execution in conjunction with said type.

21. The system of claim 15, wherein:
at least one of the constraints is a requirement to use a code segments associated with at least one of: (i) a certain type of code license, (ii) an open source origin, (iii) a closed source origin, (iv) a specific author, publisher, or provider, (v) a certain publish date or a range of dates, and (vi) a certain update date or a range of dates; and
the respective code segment selected is a code segment complying with said requirement.

22. The system of claim 15, wherein:
at least one of the constraints is a requirement to successfully complete execution of the specific task at a specific cost or lower; and
the respective code segment selected is a code segment associated with a cost determined by a provider thereof, in which the cost determined is lower than the specific cost.

23. The system of claim 22, wherein the cost determined was resolved via bidding.

24. The system of claim 15, wherein:
at least one of the constraints is a requirement to successfully complete execution of the specific task at a specific cost or lower; and
the respective code segment selected is associated with one of the sub-sets of physical computational resources that is related to a cost determined by a hardware provider of the sub-set, in which the cost determined is lower than the specific cost.

25. The system of claim 24, wherein the cost determined was resolved via bidding.

* * * * *